United States Patent
Inoue

(10) Patent No.: US 12,086,478 B2
(45) Date of Patent: Sep. 10, 2024

(54) INFORMATION PROCESSING APPARATUS CONTROLLING A PRINTER CAPABLE OF TWO-SIDED PRINTING, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Yuki Inoue, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/376,047

(22) Filed: Oct. 3, 2023

(65) Prior Publication Data

US 2024/0134577 A1    Apr. 25, 2024
US 2024/0231709 A9    Jul. 11, 2024

(30) Foreign Application Priority Data

Oct. 21, 2022 (JP) ................................. 2022-169289

(51) Int. Cl.
    *G06F 3/12* (2006.01)
(52) U.S. Cl.
    CPC .......... *G06F 3/1204* (2013.01); *G06F 3/1205* (2013.01); *G06F 3/1254* (2013.01)
(58) Field of Classification Search
    None
    See application file for complete search history.

(56) References Cited

U.S. PATENT DOCUMENTS

| | | | | |
|---|---|---|---|---|
| 2006/0133844 A1* | 6/2006 | Konno | ........................ | B41J 3/60 399/82 |
| 2007/0177176 A1* | 8/2007 | Morooka | ................ | G06K 15/02 271/3.14 |
| 2007/0242999 A1* | 10/2007 | Tao | ..................... | G03G 15/6544 400/188 |
| 2023/0315362 A1* | 10/2023 | Yamamoto | ......... | G06K 15/1836 |

FOREIGN PATENT DOCUMENTS

JP      2004-012982 A      1/2004

\* cited by examiner

*Primary Examiner* — Thomas D Lee
(74) *Attorney, Agent, or Firm* — VENABLE LLP

(57) ABSTRACT

An information processing apparatus controls a printer capable of printing on a sheet-shaped recording medium. The apparatus includes a memory containing instructions and a processor for executing the instructions to set, as a print setting for a first print process, a two-sided print setting or a one-sided print setting. In addition, a controller controls whether to execute control for discharging a recording medium printed by the first print process in a face-up manner or a face-down manner based on at least one of whether the two-sided print setting is set for a second print process executed before the first print process and whether the second print process is for printing pages, when the two-sided print setting is set for the first print process that prints one page.

19 Claims, 28 Drawing Sheets

FIG. 4

| Printer A | | | | |
|---|---|---|---|---|
| Document name | Status | Owner | Number of pages | |
| Job A | Printing | User A | 1 | |

*FIG. 5*

```
StartJob

<Print setting information>

Medium: Plain paper

Sheet size: A4

Two-sided setting: One-sided print

.
        .
        .
        .

<Image data information>

.
        .
        .
        .      }- First page
        .
        .
        .

EndJob
```

*FIG. 6*

| Printer A | | | |
|---|---|---|---|
| Document name | Status | Owner | Number of pages |
| Job A | Printing | User A | 2 |

205

FIG. 7
```
StartJob
<Print setting information>
Medium: Plain paper
Sheet size: A4
Two-sided setting: Manual two-sided print
        *
        •
        •
        •
<Image data information>
```
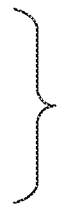
```
EndJob
```

Turn over discharged sheet and set it in paper feeding port of the printer.

[Restart print]

*FIG. 9*

```
StartJob

<Print setting information>

Medium: Plain paper

Sheet size: A4

Two-sided setting: Automatic two-sided print

.
    .
    .
    .

<Image data information>

.
    .
    .
    .   }- First page
    .
    .
    .

.
    .
    .
    .   }- Second page
    .
    .
    .

EndJob
```

FIG. 10

```
StartJob

<Print setting information>

Medium: Plain paper

Sheet size: A4

Two-sided setting: Automatic two-sided print

.
       .
       .
       .

<Image data information>

.
       .
       .
       .       } First page
       .
       .
       .

EndJob
```

*FIG. 20*

| MEDIUM | SIZE | TWO-SIDED SETTING | NUMBER OF PAGES | DISCHARGE MANNER |
|---|---|---|---|---|
| PLAIN PAPER | A4 | AUTOMATIC TWO-SIDED PRINT | 2 | FACE-DOWN MANNER |
| PLAIN PAPER | A4 | ONE-SIDED PRINT | 1 | FACE-UP MANNER |
| PLAIN PAPER | A4 | AUTOMATIC TWO-SIDED PRINT | 1 | FACE-DOWN MANNER |

FIG. 27

|   | Document name | Medium | Size | Two-sided setting | Number of pages |
|---|---|---|---|---|---|
| 1 | Job A | Plain paper | A4 | Automatic two-sided print | 2 |
| 2 | Job B | Plain paper | A4 | One-sided print | 1 |
| 3 | Job C | Plain paper | A4 | Automatic two-sided print | 1 |

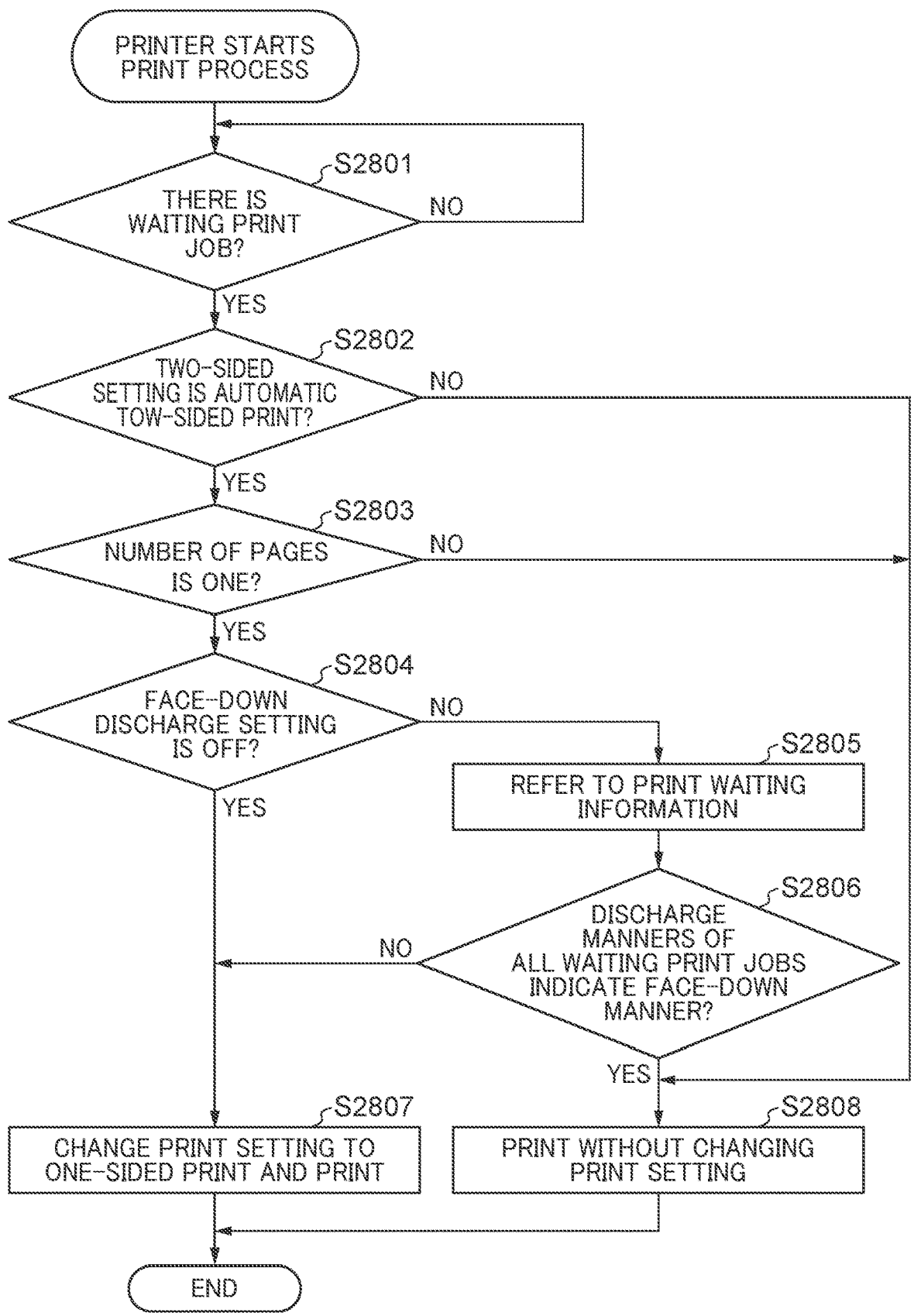

INFORMATION PROCESSING APPARATUS CONTROLLING A PRINTER CAPABLE OF TWO-SIDED PRINTING, CONTROL METHOD THEREFOR, AND STORAGE MEDIUM STORING CONTROL PROGRAM THEREFOR

BACKGROUND OF THE INVENTION

Field of the Invention

The present invention relates to an information processing apparatus controlling a printer, a control method therefor, and a storage medium storing a control program therefor.

Description of the Related Art

Some conventional inkjet printers are capable of performing one-sided print and two-sided print. There is known a printer that discharges a printing sheet without performing a reverse process after printing on a front side of the printing sheet when it is determined that there is no print data to be printed on a back side of the printing sheet (see, for example, Japanese Patent Laid-Open Publication No. 2004-12982 (JP2004-12982A)). When a print job is set to two-sided print but the print job does not print on a back side, i.e., when the print job has print data for one page, the apparatus disclosed in this publication can discharge the sheet after printing on a front side only. As a result, the reverse process is omitted, and the time until the end of print can be shortened.

For example, when a print job of two pages on both sides and a print job of one page on one side are continuously executed, a sheet is discharged in a face-down manner in the print job of two pages, and a sheet is discharged in a face-up manner in the print job of one page (one-page print job). In such discharges, the discharge manners (discharge sides) do not match, and a user needs to match the front and back sides of the printed matter after finishing print.

SUMMARY OF THE INVENTION

The present invention provides an information processing apparatus controlling a printer, a control method therefor, and a storage medium storing a control program therefor, which are capable of switching a discharge manner of a one-page print job in the printer in a two-sided print setting between a face-up manner and a face-down manner if necessary.

Accordingly, an aspect of the present invention provides a control method for an information processing apparatus that controls a printer capable of printing on a sheet-shaped recording medium having a first side and a second side on a back side of the first side. The control method includes a setting step of setting, as a print setting for executing a first print process, a two-sided print setting for printing on both the first and second sides or a one-sided print setting for printing on only one of the first and second sides, and a control step of controlling whether to execute control for discharging a recording medium printed by the first print process in a face-up manner or to execute control for discharging a recording medium printed by the first print process in a face-down manner based on at least one of whether the two-sided print setting is set as a print setting for executing a second print process that is executed by the printer before the first print process and whether the second print process is a process for printing a plurality of pages, in a case where the two-sided print setting is set as a print setting for executing the first print process and where the first print process is a process for printing one page.

According to the present invention, the discharge manner of the one-page print job in the printer in the two-sided print setting can be switched between the face-up manner and the face-down manner if necessary.

Further features of the present invention will become apparent from the following description of exemplary embodiments with reference to the attached drawings.

BRIEF DESCRIPTION OF THE DRAWINGS

FIG. 4 is a view showing an example of a print queue in the Microsoft Windows.

FIG. 5 is a view showing a configuration example of a print job generated by a graphic driver in the print queue shown in FIG. 4.

FIG. 6 is a view showing an example of a print queue in the Microsoft Windows.

FIG. 7 is a view showing a configuration example of a print job generated by the graphic driver in the print queue shown in FIG. 6.

FIG. 9 is a view showing a configuration example of a print job generated by the graphic driver in the print queue shown in FIG. 6.

FIG. 10 is a view showing a configuration example of a print job generated by the graphic driver in the print queue shown in FIG. 4.

FIG. 20 is a table showing an example of the print history.

FIG. 27 is a table showing an example of print waiting information registered in the print job saving process shown in FIG. 26.

FIG. 28 is a flowchart showing a print process performed by the printer.

DESCRIPTION OF THE EMBODIMENTS

Figure 1:
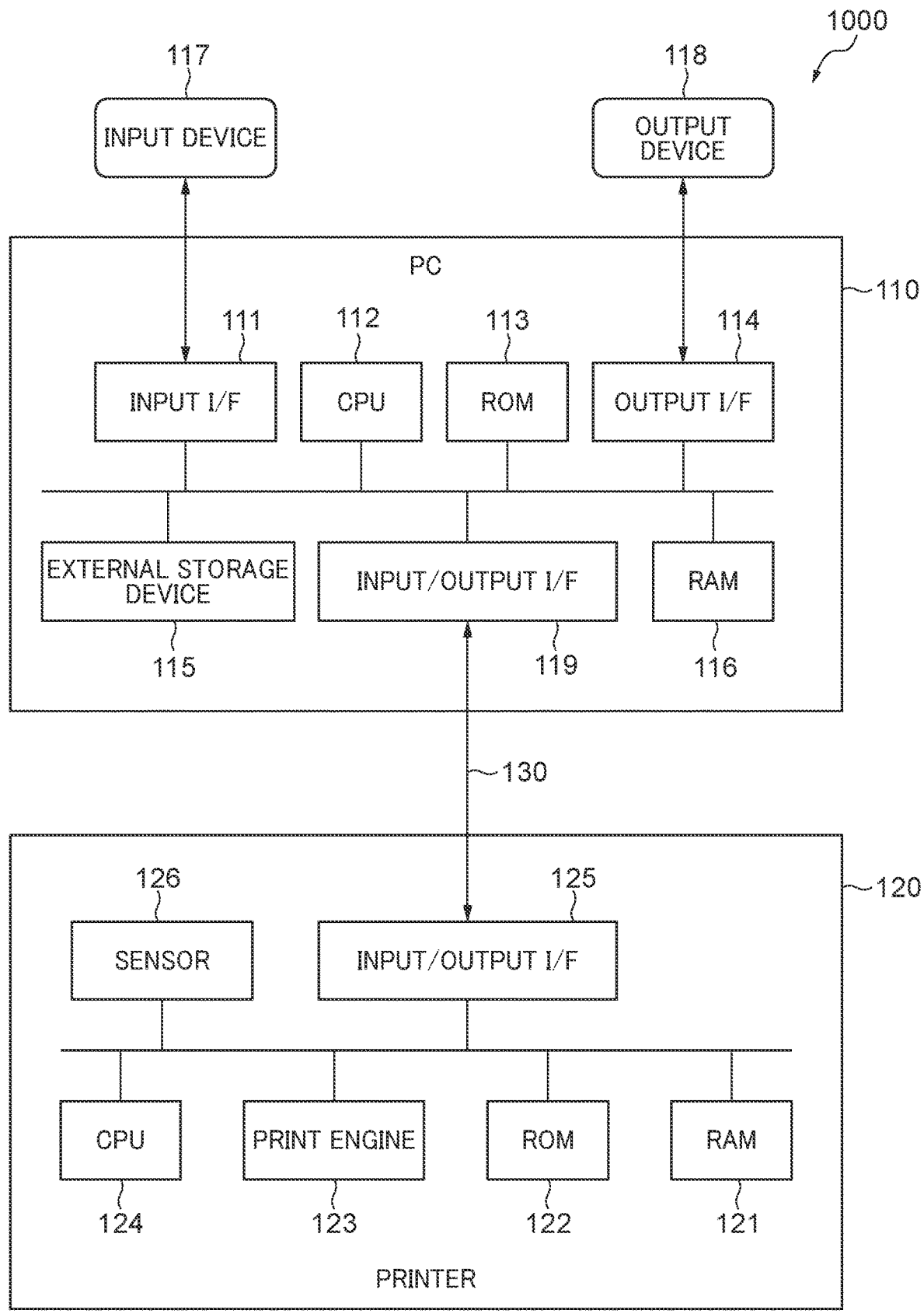
FIG. 1 is a block diagram showing a hardware configuration of a printing system.

Hereafter, embodiments according to the present invention will be described in detail by referring to the drawings. However, configurations described in the following embodiments are merely examples, and the scope of the present invention is not limited by the configurations described in the embodiments. For example, each unit constituting the present invention can be replaced with any configuration capable of exhibiting the same function. In addition, an arbitrary constituent may be added. Any two or more configurations (features) of the embodiments can be combined.

Hereinafter, a first embodiment will be described with reference to FIG. 1 to FIG. 13. FIG. 1 is a block diagram showing a hardware configuration of a printing system. The printing system 1000 shown in FIG. 1 includes a personal computer (PC) 110 serving as an information processing apparatus and a printer (printing apparatus) 120 that performs printing. The PC 110 is communicably connected to the printer 120 and can operate the printer 120. Although the information processing apparatus is the PC 110 in this embodiment, it is not limited thereto. For example, various portable terminals, such as a smartphone, a notebook PC, and a tablet terminal, or an image processing apparatus may be used in place of the PC 110.

The printer 120 is a device that performs printing on a sheet-like recording medium (i.e., a printing sheet) having a first side (front side) and a second side that is a back side of the first side. The printer 120 is an inkjet printer in this embodiment. The printer 120 may be a full-color printer or a monochrome printer. An external apparatus connected to the information processing apparatus is not limited to the printer 120. For example, the external apparatus may be an image processing apparatus, such as a laser beam printer, a copying machine, or a facsimile machine. The image processing apparatus may be a multifunction apparatus or a single function apparatus. Although there is the single PC 110 in the printing system 1000 shown in FIG. 1, there may be a plurality of PCs. When there is a plurality of PCs, each PC is connected to the printer 120.

The printer 120 in this embodiment is capable of performing one-sided print and two-sided print. In the printer 120 in this embodiment, a printing unit having an ink ejection mechanism (a head) for ejecting ink is disposed in a middle of a printing path through which a printing sheet passes. The ink ejection mechanism ejects ink onto the surface of the printing sheet to print when the printing sheet passes directly under the ink ejection mechanism.

In the one-sided print, the printer 120 prints on a front side of a printing sheet and discharges the printed sheet in a face-up manner, i.e., with the front side facing up. The printer 120 has a circulation path that reverses the front and back of a printing sheet and then returns the printing sheet to the printing path in the two-sided print. That is, in the case of the two-sided print, the printer 120 prints on the front side of the printing sheet in the same manner as in the one-sided print, then reverses the front and back of the printing sheet in the circulation path, and returns the printing sheet to the printing path again. Then, the printer 120 prints on the back side of the printing sheet and discharges the printed sheet in the face-down manner as-is, that is, with the front side facing down. Such two-sided print is referred to as "automatic two-sided print".

The front side is the printed side in the one-sided print and the side printed first between two sides of the sheet in the two-sided print. The back side is the side that is not printed in the one-sided print, and is the side printed later between two sides of the printing sheet in the two-sided print.

Further, the printer 120 may be configured to be capable of shortening the time required for the two-sided print. In this configuration, first, print data for a plurality of pages in which a two-sided print range is designated is input from the outside to the printer 120. Then, the printer 120 prints only on the front sides of a preset maximum number of printing sheets that can be circulated. Thereafter, the user reverses the front and back sides of the printing sheets printed only on the front sides and refeeds the printing sheets to the printer 120. Upon receiving the user operation, the printer 120 sequentially prints on the back sides of the printing sheets printed only on the front sides. By repeating this operation, the two-sided print can be performed in a shorter time. Such two-sided print is referred to as a "manual two-sided print".

A print job can also be sent to the printer 120 from an information processing apparatus, such as the PC 110. In this case, the printer 120 can perform printing based on the print job from the PC 110. In the case of one-sided print, the PC 110 generates a print job for the one-sided print and transmits the print job to the printer 120. This enables the printer 120 to perform the one-sided print. At this time, the printer 120 prints on one side (front side) of a printing sheet and then discharges the printing sheet in the face-up manner.

In the case of automatic two-sided print, the PC 110 generates a print job for the two-sided print and transmits the print job to the printer 120. This enables the printer 120 to perform the automatic two-sided print. At this time, the printer 120 prints on the front side of the printing sheet, performs a reverse process to the printing sheet, prints on the back side of the printing sheet, and discharges the printing sheet in the face-down manner. When there is no print data to be printed on the back side in the automatic two-sided print, the printer 120 prints on the front side of the printing sheet, performs the reverse process, and then discharges the printing sheet in the face-down manner without printing on the back side.

As shown in FIG. 1, the PC 110 has an input OF 111, a CPU 112, a ROM 113, an output OF 114, an external storage device 115, a RAM 116, an input device 117, an output device 118, and an input/output OF 119. The CPU 112 is a system controller and controls the entire PC 110. The ROM 113 stores control programs executed by the CPU 112 and fixed data like a data table. For example, the control programs include a program for causing a computer to achieve units, means, etc. (control method) of a print controller described below. The external storage device 115 stores an operating system (hereinafter referred to as an "OS"), a printer driver, and other various data and software.

In this embodiment, Windows (registered trademark) shall be used as the OS. The RAM 116 is constituted by an SRAM (Static Random Access Memory) that needs a backup power supply, or the like and holds data using a primary battery (not shown) for backup. The RAM 116 stores data of which deletion is inhibited, such as program control variables. The RAM 116 is used as a work memory by various programs stored in the ROM 113 and the external storage device 115. In this embodiment, the CPU 112, ROM 113, external storage device 115, and RAM 116 constitute the print controller that controls a print operation on a recording medium. The "print operation" is an operation (a print job) performed by the printer 120 and includes, for example, at least a sheet discharge operation among operations from sheet feeding, printing, and sheet discharge.

The input device 117 functions as an operation unit that receives an operation from a user, and includes, for example, keys, such as numerical value input keys, a mode setting key, an enter key, a cancel key, and a power key. The input device 117 is connected to the input OF 111. As a result, the input OF 111 serves as an interface for receiving data entry and operation instructions from the user via the input device 117.

The output device 118 functions as a display unit for displaying information and a state of the PC 110, and is constituted by, for example, an LED (light emitting diode), an LCD (liquid crystal display), etc. The output device 118 is connected to the output OF 114. As a result, the output OF 114 serves as an interface for controlling the output device 118 to display information and notify the state of the PC 110. The input device 117 and the output device 118 may be configured as a single device. This enables the single device to display information and receive an operation.

The input/output I/F 119 is connected to an input/output I/F 125 of the printer 120 via the connection interface 130. This connection enables mutual communication between the PC 110 and the printer 120. The input/output I/F 119 corresponds to a port of the PC 110. Connection of ports via the connection interface 130 enables communication between apparatuses having the ports. The types of ports include, for example, a network port for connection via a network, and a USB port for connection to the printer 120 via a USB.

The network port may be directly connected by a wireless connection or may be connected via an access point located on a wired network. The connection via the network is performed by, for example, a wired LAN or a wireless LAN. The communication method for connection may employ wireless fidelity (Wi-Fi), Bluetooth (registered trademark), or near field communication (NFC; ISO/IEC IS 18092). A plurality of types of network ports may be prepared in accordance with communication methods and connection methods. In this embodiment, the PC 110 shall be connected to the printer 120 using the port 1.

The connection interface 130 is, for example, USB, LAN, or the like, but is not limited. Communication via the connection interface 130 may be performed directly by wireless communication, or may be performed via an access point installed on a wired network. The communication method may employ Wi-Fi, Bluetooth, or NFC.

As shown in FIG. 1, the printer 120 includes a RAM 121, a ROM 122, a print engine 123, a CPU 124, the input/output OF 125, and a sensor 126. The CPU 124 is a system control unit that controls the entire printer 120. The ROM 122 stores a control program that is executed by the CPU 124.

In the printer 120, the sensor 126 capable of determining presence of a printed sheet is installed at a sheet discharge port. When the sensor 126 determines that there is a printed sheet, the ROM 122 holds the print information about the target print job as a print history. The RAM 121 is constituted by an SRAM (Static Random Access Memory) or the like that requires a backup power supply, and is held by a primary battery (not shown) for backup. The RAM 121 stores data of which deletion is inhibited, such as program control variables. The RAM 121 is used as a work memory of the CPU 124, and is also used as a buffer for temporarily storing received information.

The print engine 123 forms an image on a recording medium like a paper sheet using a recording agent like ink based on the data stored in the RAM 121 and the print job received from the PC 110, and outputs a print result. The input/output I/F 125 is connected to the input/output I/F 119 via the connection interface 130.

Figure 2:
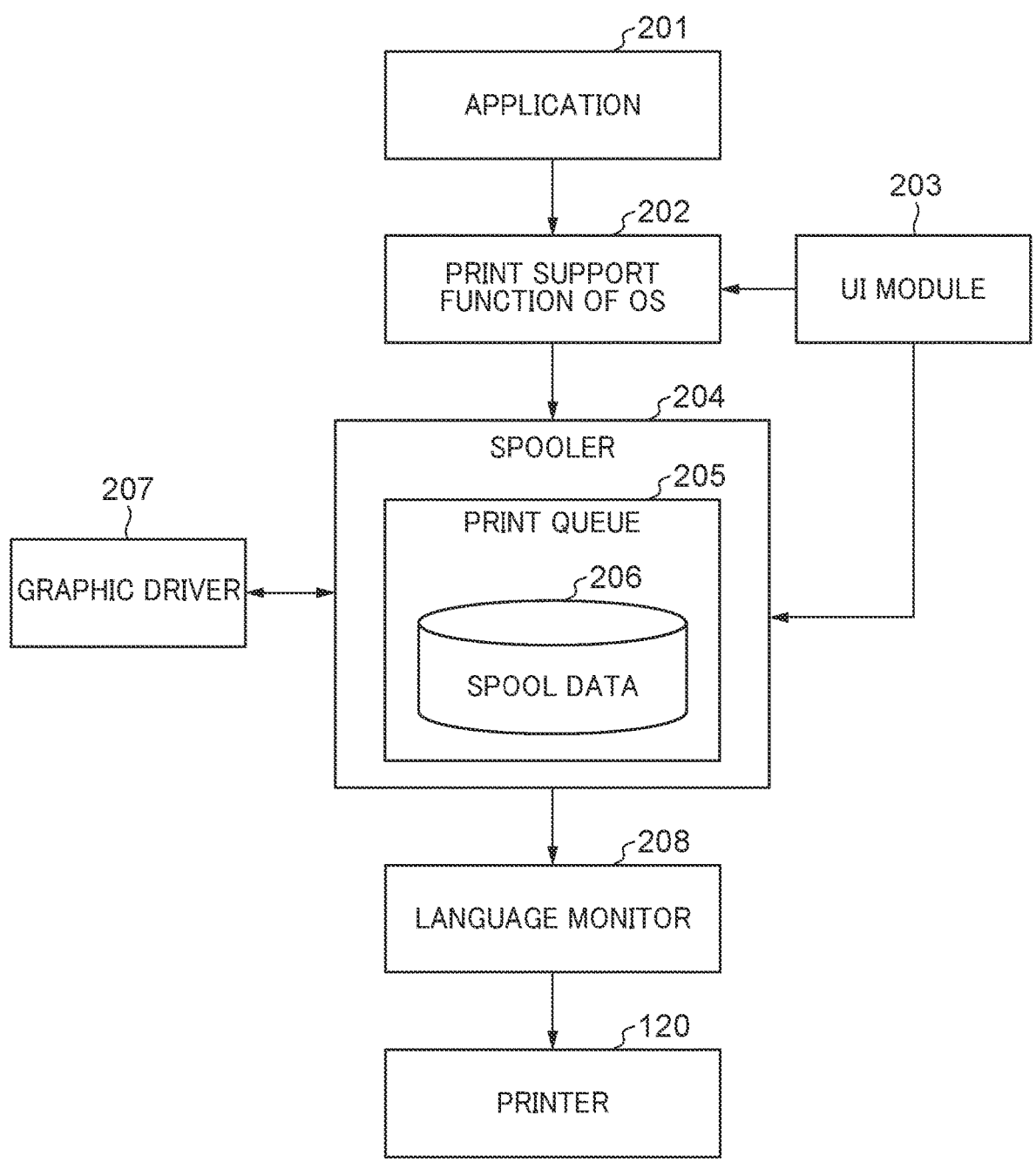
FIG. 2 is a block diagram showing a configuration of software stored in an external storage device of a PC.

FIG. 2 is a block diagram showing a configuration of software stored in an external storage device of the PC. The software components shown in FIG. 2 include an application 201, a print support function 202 of the OS, a UI module 203, a spooler 204, a graphic driver 207, and a language monitor 208.

The spooler 204 also includes a print queue 205 and spool data 206. The print support function 202, the spooler 204, and the spool data 206 are modules of the OS. The UI module 203, the graphic driver 207, and the language monitor 208 are modules of the printer driver. Configurations of the modules of the OS and the modules of the printer driver are not limited to the configurations shown in FIG. 2.

A process executed by each component is achieved by the CPU 112 reading a program corresponding to each component from the external storage device 115, loading the program into the RAM 116, and executing the program. The application 201 is stored in the external storage device 115 and generates print data including image information including image data information, which includes image information about a chargeable content to be printed and character information, and print setting information, which includes a medium, a sheet size, and a layout.

The print setting information returned from the UI module 203 via the print support function 202 of the OS is added to the print data generated by the application 201. The print data is temporarily stored in the print queue 205 of the spooler 204 as the spool data 206. The spooler 204 has a job management function, and holds and manages the spool data 206 until it is recognized that the transmission of the print job corresponding to the spool data 206 is completed.

Specifically, the spooler 204 manages the size of the print job, the job name, etc., for each printer, for example. The spooler 204 displays the managed information on the output device 118 by transmitting the managed information to the status display application. The information about the spool data 206 stored in the print queue 205 can be referred to using a predetermined interface function via the graphic driver 207, the UI module 203, or the application 201.

The spool data 206 is converted by the graphic driver 207 into print commands interpretable by the printer 120, and a print job is generated. The print job is transmitted from the spooler 204 to the language monitor 208.

The language monitor 208 divides the print job into packets of a specific size and transmits them one by one to the printer 120 via the input/output OF 119 and the input/output OF 125. At this time, the size of data transmitted at a time is instructed by the spooler 204. The spooler 204 executes this instruction by the application 201 or the UI module 203. The language monitor 208 also has a function of obtaining status information about the printer 120 or status information about a job input to the printer 120. The "job" is, for example, a print job, a scan job, a maintenance job, or the like. The PC 110 transmits a job to the printer 120 to cause the printer 120 to execute a process, such as printing, scanning, or maintenance, in accordance with the job.

Figure 3:
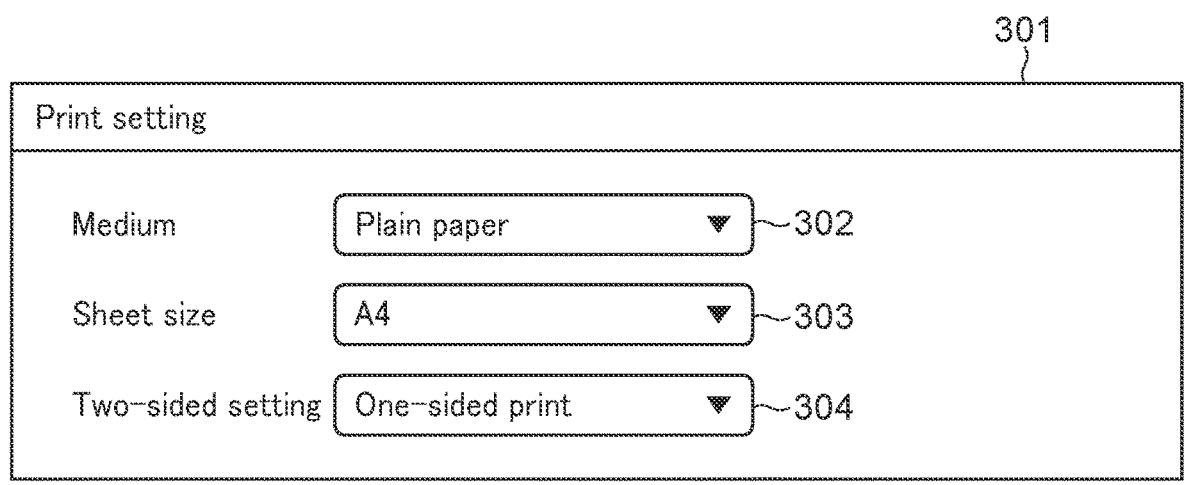
FIG. 3 is a view showing an example of a print setting screen displayed by a UI module of the PC.
Figure 8:
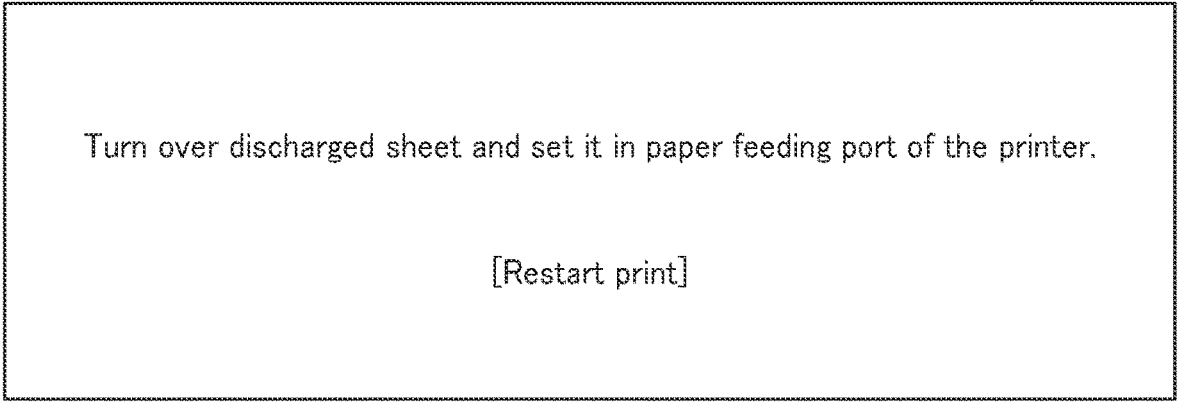
FIG. 8 is a view showing an example of a dialog.

FIG. 3 is a view showing an example of a print setting screen 301 displayed by the UI module of the PC. The print setting screen 301 shown in FIG. 3 is called from the application 201 via the print support function 202 of the OS. The print setting screen 301 includes a medium setting combo box 302, a sheet size setting combo box 303, and a two-sided setting combo box 304.

In the medium setting combo box 302, medium types, such as plain paper, photo paper, and postcard, that can be printed by the printer 120 are listed as options. The user can designate a desired medium from the medium setting combo box 302.

In the sheet size setting combo box 303, sheet sizes (medium sizes), such as A4, B5, and postcard, that can be printed by the printer 120 are listed as options. The user can designate a desired sheet size from the sheet size setting combo box 303.

In the two-sided setting combo box 304, two-sided settings that can be printed by the printer 120 are listed as options. The two-sided settings include two-sided print and one-sided print. The two-sided print is a setting that enables printing on a front side and a back side (both sides) of a medium. The one-sided print is a setting that enables printing on a front side (or a back side) of a medium. As described above, the two-sided print includes the automatic two-sided print (first two-sided print) and the manual two-sided print (second two-sided print).

The "automatic two-sided print" refers to a printing operation that prints on a front side of a medium, performs a front/back reverse process in the printer 120, and then prints on a back side, for a print job. When a print job needs a plurality of media, such a printing operation is repeated for each medium. The "manual two-sided print" refers to a printing operation that prints on front sides of all media in advance, and prints on back sides of all the media after reversing and resetting of the media by a user for a print job.

The user can designate a desired two-sided setting from the two-sided setting combo box 304. The print setting designated through the UI module 203 is added as the print setting information to the print data generated by the application 201 via the print support function 202 of the OS. This print setting is temporarily stored in the print queue 205 of the spooler 204 as the spool data 206.

FIG. 4 is a diagram showing an example of a print queue in Microsoft Windows. The print queue 205 shown in FIG. 4 is a graphical user interface that holds and manages the spool data 206 passed to the spooler 204 until it is recognized that the transmission of the print job corresponding to the spool data 206 is completed. The print queue 205 displays information about a processing status of the print job generated by the spool data 206 and the graphic driver 207.

The print queue 205 includes a printer name display section 401, a document name display section 402, a status display section 403, an owner display section 404, and a page count display section 405. The printer name display section 401 displays a printer name. The document name display section 402 displays a name of a print job generated by the spool data 206 and the graphic driver 207. The status display section 403 displays a status of the print job generated by the spool data 206 and the graphic driver 207.

For example, when "printing" is displayed in the status display section 403, it indicates that the printer 120 is executing a print process. When nothing is displayed in the state display section 403, it indicates that the spool data 206 is in a waiting state without performing a generation process and a transmission process of a print job. Hereinafter, the spool data 206 that is in the waiting state without being subjected to the generation process, the transmission process of a print job may be referred to as a "waiting print job".

The owner display section 404 displays an owner of the print job generated by the spool data 206 and the graphic driver 207. That is, a name of the user who performed the print process is displayed. The number of pages of the print job generated by the spool data 206 and the graphic driver 207 is displayed in the page count display section 405. The print queue 205 shown in FIG. 4 indicates that a job A owned by a user A and having one page is under printing.

FIG. 5 is a view showing a configuration example of a print job generated by the graphic driver in the print queue shown in FIG. 4. As shown in FIG. 5, a StartJob command indicating the start of printing is stored. The StartJob command includes the print setting information and the image data information. The print setting information includes, for example, print settings set through a graphical user interface displayed by the UI module 203. In this case, "medium: plain paper", "sheet size: A4", and "two-sided setting: one-sided print" are stored as print settings. Print settings other than the medium, the sheet size, and the two-sided setting may also be stored.

The image data information is data generated in an image format supported by the printer 120. In the case of the job A in FIG. 4, data of one page generated in a predetermined image format is stored. When the print job shown in FIG. 5 is transmitted to the printer 120, the printer 120 prints one page under the settings of "medium: plain paper", "sheet size: A4", and "two-sided setting: one-sided print". Specifically, after receiving the print job, the printer 120 causes the printing sheet to pass under the ink ejection mechanism that ejects ink. As a result, an image is printed on the front side of the printing sheet. Thereafter, the printing sheet is discharged as-is in the face-up manner with the printed side facing up.

FIG. 6 is a view showing another example of a print queue in the Microsoft Windows. The print queue 205 shown in FIG. 6 indicates that a job A owned by the user A and having two pages is under printing.

FIG. 7 is a view showing a configuration example of a print job generated by the graphic driver in the print queue shown in FIG. 6. The difference between FIG. 5 and FIG. 7 is that "two-sided setting: one-sided print" is set in FIG. 5 but "two-sided setting: manual two-sided print" is set in FIG. 7. In FIG. 7, data of two pages generated in the predetermined image format is stored as the image data information. When the print job shown in FIG. 7 is transmitted to the printer 120, the printer 120 prints two pages according to the print job under the settings of "medium: plain paper", "sheet size: A4", and "two-sided setting: manual two-sided print".

Specifically, after receiving the print job, the printer 120 passes the printing sheet under the ink ejection mechanism. As a result, the printer prints on the front side of the printing sheet, that is, the first page is printed. Thereafter, the language monitor 208 displays a dialog shown in FIG. 8, for example. In the dialog 801 shown in FIG. 8, a message "Turn over discharged sheet and set it in the paper feeding port of the printer." is displayed. The user who confirms the message turns over the discharged printing sheet and set sets the printing sheet in the sheet feeding port of the printer 120. After setting the printing sheet, the user operates the print restart button. As a result, the printer 120 prints on the back side of the printing sheet, that is, the second page is printed. Thereafter, the printing sheet is discharged in the face-down manner with the previously printed side (first page) facing down.

FIG. 9 is a view showing a configuration example of a print job generated by the graphic driver in the print queue shown in FIG. 6. The difference between FIG. 7 and FIG. 9 is that "two-sided setting: manual two-sided print" is set in FIG. 7, but "two-sided setting: automatic two-sided print" is set in FIG. 9. When the print job shown in FIG. 9 is transmitted to the printer 120, the printer 120 prints two pages according to the print job under the settings of "medium: plain paper", "sheet size: A4", and "two-sided setting: automatic two-sided print".

Specifically, after receiving the print job, the printer 120 prints on the front side of the printing sheet in the same manner as the one-sided print, and then conveys the printing sheet to the circulation path and reverses the front and back sides. Thereafter, the printer 120 conveys the printing sheet to the print path again and prints on the back side. The printing sheet is discharged in the face-down manner with the first page facing down.

As described above, the printer 120 discharges the printed sheet in the face-up manner, when the number of pages is one in a state where the one-sided print is set. In the meantime, when the number of pages is two or more in a state where the two-sided setting is set to the manual two-sided print or the automatic two-sided print, the printer discharges the printed sheet in the face-down manner.

Next, a case of a one-page print job in which the two-sided setting is set to the automatic two-sided print will be described. FIG. 10 is a view showing a configuration example of a print job generated by the graphic driver in the print queue shown in FIG. 4. The difference between FIG. 5 and FIG. 10 is that "two-sided setting: one-sided print" is set in FIG. 5, but "two-sided setting: automatic two-sided print" is set in FIG. 10. When the print job shown in FIG. 10 is transmitted to the printer 120, the printer 120 prints one page according to the print job under the settings of "medium: plain paper", "sheet size: A4", and "two-sided setting: automatic two-sided print".

Specifically, after receiving the print job, the printer 120 first prints the first page on the front side (one side) of the printing sheet. There is no image data to be printed on the back side. Therefore, the printer 120 can perform one of two operations. The first operation directly discharges the printed sheet in the face-up manner without being reversed. The second operation reverses the printed sheet and discharges the printed sheet of which the back side is blank in the face-down manner. Which of these two operations is appropriate depends on various conditions. For example, since the first operation discharges the printed sheet as-is without performing the reverse process, there is an advantage that the time until the printing is completed is shortened as compared with the second operation because the reversing process is omitted.

In the meantime, for example, when a print job of the automatic two-sided print for a plurality of pages is performed before or after the print job of the first operation, the printed sheet of the print job of the first operation is discharged in the face-up manner, but the printed sheet of the print job of the automatic two-sided print for the plurality of pages is discharged in the face-down manner. As a result, the printed sheet in the face-up manner and the printed sheet in the face-down manner are mixed in the discharge port. This requires a complicated operation to match front and back of the printed sheets from the user. In the meantime, when the print job of the automatic two-sided print for the plurality of pages is performed before or after the print job of the second operation, all the printed sheets are discharged in the face-down manner. There is an advantage that discharge manners are matched. As described above, which of the first operation and the second operation is appropriate is depending on the various conditions.

Figure 11:
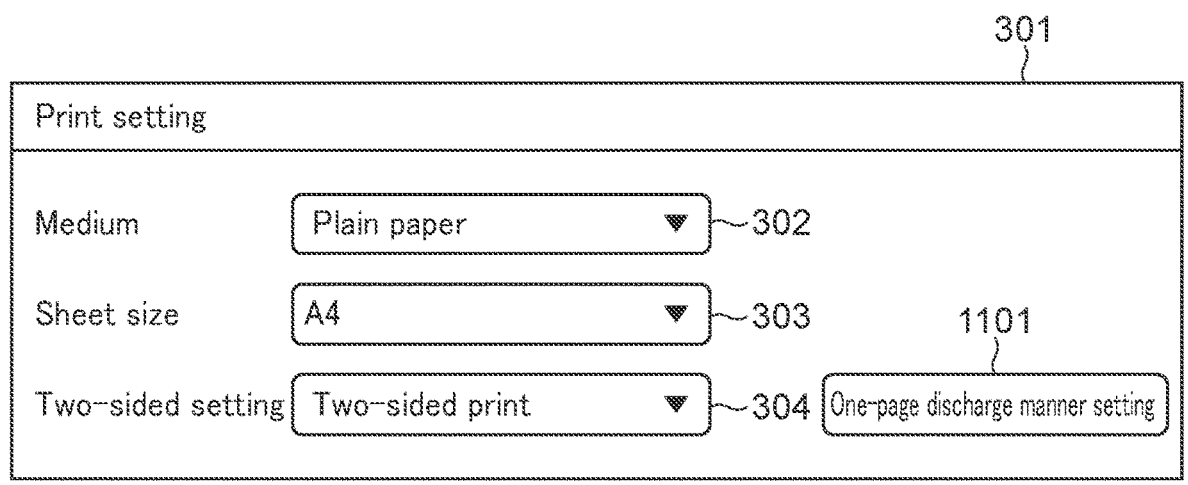
FIG. 11 is a view showing an example of a print setting screen displayed by the UI module of the PC.
Figure 12:
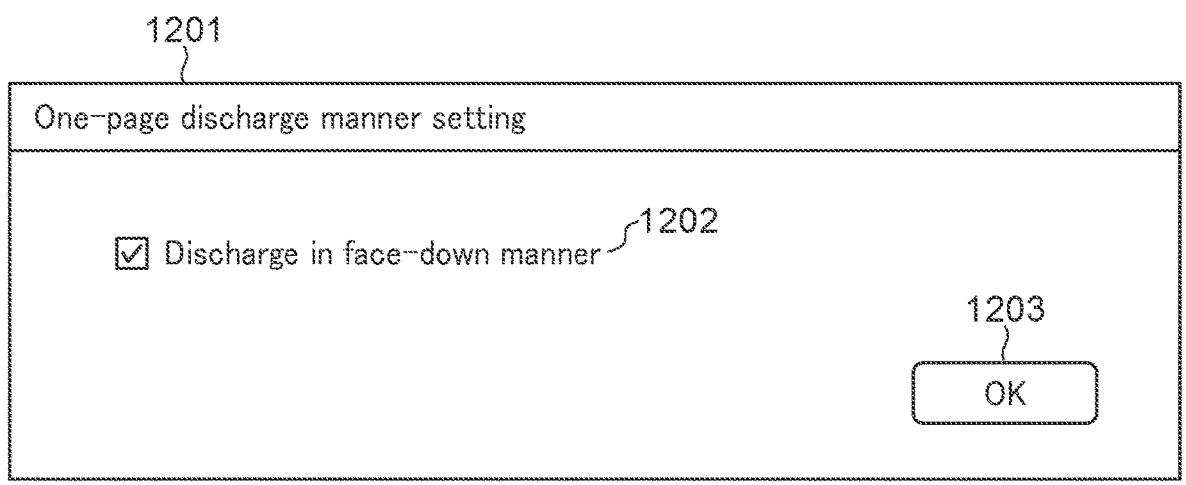
FIG. 12 is a view showing an example of a one-page discharge manner setting screen displayed when a predetermined operation is performed on the print setting screen shown in FIG. 11.

Next, switching between the operation of discharging in the face-up manner and the operation of discharging in the face-down manner, which is appropriate for the user, will be described. FIG. 11 shows an example of a print setting screen displayed by the UI module of the PC. FIG. 12 is a view showing an example of a one-page discharge manner setting screen displayed when a predetermined operation is applied on the print setting screen shown in FIG. 11. The difference between FIG. 3 and FIG. 11 is that a one-page discharge manner setting button 1101 is arranged on the right side of the two-sided setting combo box 304 in FIG. 11. When the one page discharge manner setting button 1101 is pressed in a state where the automatic two-sided print (two-sided print) is set in the two-sided setting combo box 304, a one-page discharge manner setting screen 1201 shown in FIG. 12 is displayed. The one-page discharge manner setting screen 1201 includes a check box 1202 and an OK button 1203.

The check box 1202 is an item (a screen) that allows the user to select the discharge manner between the face-up manner and the face-down manner. When only one of the front and back sides is printed in the automatic two-sided print, the sheet is discharged with the printed side facing up in the face-up manner or the sheet is discharged with the printed surface facing down in the face-down manner. That is, the check box 1202 is an item for setting, in the case of a one-page print job in the automatic two-sided print, whether the printed sheet is discharged in the face-up manner as-is without performing the sheet reverse process or the printed sheet of which the back side is blank is discharged in the face-down manner with performing the sheet reverse process.

The UI module 203 (CPU 112) of the PC 110 displays the check box 1202 on the output device 118. Therefore, in this embodiment, the UI module 203 functions as a selection unit (selection step) capable of selecting whether the printed sheet is discharged in the face-up manner or the face-down manner in the case of the one-page print job in which the automatic two-sided print is set.

In the configuration shown in FIG. 12, when the check box 1202 is checked, the printed sheet is discharged in the face-down manner, and when the check box 1202 is not checked, the printed sheet is discharged in the face-up manner. The user can designate whether the check box 1202 is checked and press the OK button 1203. As a result, the setting according to the designation is completed, and the one-page discharge manner setting screen 1201 is closed. Then, a sheet is printed according to the operation designated on the one-page discharge manner setting screen 1201.

Figure 13:
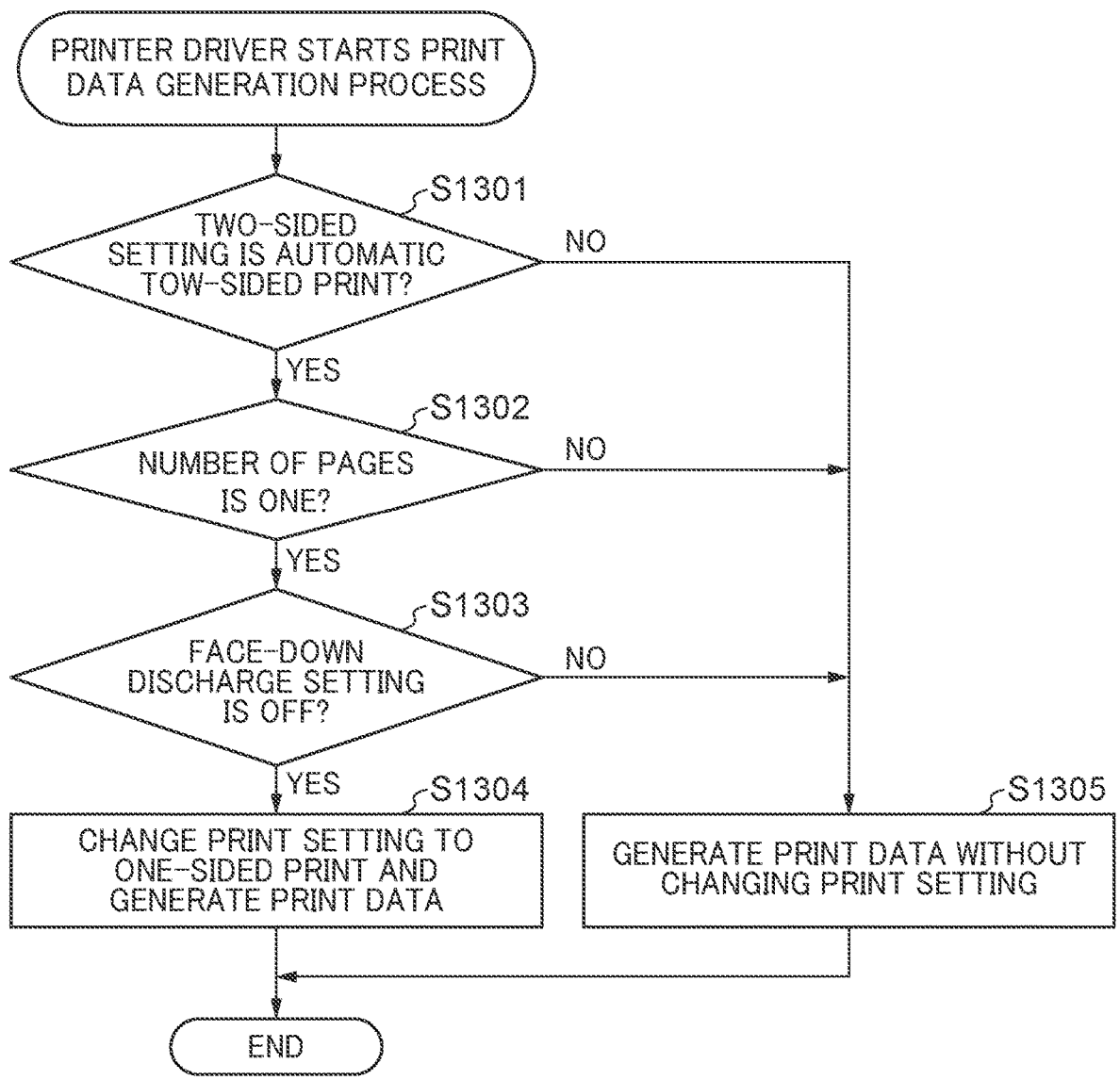
FIG. 13 is a flowchart showing a print job generation process performed by the graphic driver of the PC.

FIG. 13 is a flowchart showing a print job generation process performed by the graphic driver of the PC. Specifically, the process of this flowchart is achieved by the CPU 112 loading a program like the graphic driver 207 stored in the ROM 113 etc. onto the RAM 116 and executing the program. That is, the processing described below as processing executed by the graphics driver 207 is actually processing executed by the CPU 112 using the graphics driver 207.

The process executed by the graphic driver 207 in this embodiment may be achieved by a program other than the graphic driver 207. The other program is, for example, an application program for printing, another module included in the printer driver, or an OS-standard printer driver different from the printer driver including the graphic driver 207.

As shown in FIG. 13, in step S1301, the graphic driver 207 refers to the print setting information designated by the UI module 203 from the spool data 206 in generating the print job. Then, the graphic driver 207 determines whether the two-sided setting of the print setting information is set to the automatic two-sided print. As a result of the determination in the step S1301, when it is determined that the automatic two-sided print is designated, the process proceeds to step S1302. In the meantime, as a result of the determination in the step S1301, when it is determined that the automatic two-sided print is not designated, the process proceeds to step S1305.

In the step S1302, the graphic driver 207 determines whether the number of pages of the print job is one. That is, it is determined whether the amount of print data corresponds to one page. As a result of the determination in the step S1302, when it is determined that the number of pages is one, the process proceeds to step S1303. In the meantime, as a result of the determination in the step S1302, when it is determined that the number of pages is not one, the process proceeds to the step S1305.

In the step S1303, the graphic driver 207 determines whether the check box 1202 for the face-down manner on the one-page discharge manner setting screen 1201 shown in FIG. 12 is checked (whether the face-down discharge setting is OFF). As a result of the determination in the step S1303, when it is determined that there is no check, the process proceeds to step S1304. In the meantime, as a result of the determination in the step S1303, when it is determined that there is a check, the process proceeds to step S1305

In the step S1304, the graphic driver 207 changes the two-sided setting of the print setting from the automatic two-sided print to the one-sided print and generates print data. The generation of the print data allows the printer 120 to discharge the printed sheet in the face-up manner without reversing the printed sheet.

In the step S1305, the graphic driver 207 generates the print data without changing the print setting. That is, when the determination result in the step S1302 is NO or when the determination result in the step S1303 is NO, the graphic driver 207 generates the print data with keeping the two-sided setting as the automatic two-sided print. When the print data is transmitted to the printer 120, the printer 120 can perform the reverse process of the printed sheet and discharges the printed sheet of which the back side is blank in the face-down manner. When the print setting is the one-sided print or the manual two-sided print (NO in the step S1301), print data is generated with the original setting as-is, and the printer 120 discharges the printed sheet in the face-up manner.

As described above, in this embodiment, the discharge manner of the printer 120 for a one-page print job in the state where the two-sided print is set can be switched between the face-up manner and the face-down manner in accordance with a user's desire (user's need). This allows the user to appropriately switch the discharge manner between the face-up manner and the face-down manner. It is also possible to select the face-down manner regardless of the automatic two-sided print or the manual two-sided print. As a result, it is possible to discharge the printed sheet in the discharge manner corresponding to the need of an individual user.

Hereinafter, a second embodiment will be described with reference to FIG. 14 to FIG. 17. Differences from the above-described embodiment will be mainly described, and the description of the same matters will be omitted. In the first embodiment, the process for appropriately switching the sheet discharge manner by a user between the face-up manner and the face-down manner in the case of a one-page print job in which the two-sided setting is the automatic two-sided print has been described.

However, in this process, when a one-page print job of the automatic two-sided print is executed, if there is a print job that is already under printing and its discharge manner is the face-down manner, the following issue may occur. This issue is that the discharge manner in a case where there is no check in the check box 1202 for the one-page print job of the automatic two-sided print becomes the face-up manner, which is not matched with the face-down manner of the print job that is already under printing.

For example, a case where the graphic driver 207 performs a process of generating a next job B (second print job) while the printer 120 is receiving and printing a job A (first print job) is considered. In this case, when the discharge manner of the job B is not determined depending on whether the discharge manner of the job A under printing by the printer 120 is the face-up manner or the face-down manner, the discharge manner of the job B may not match the discharge manner of the job A. Therefore, the PC 110 preferably determines the discharge manner of the job B with reference to the two-sided setting of the job A under printing. This process will be described in this embodiment.

Figure 14:
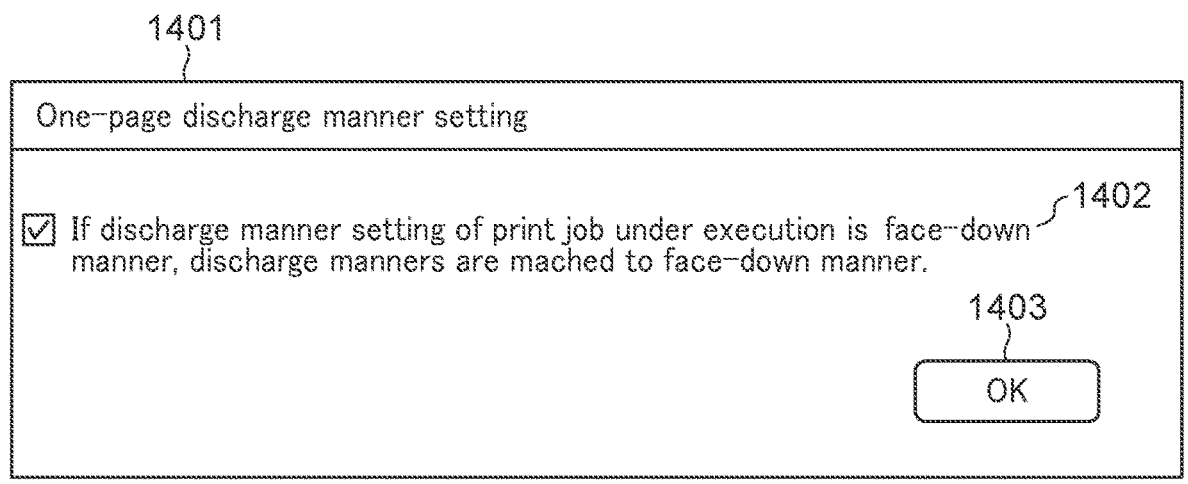
FIG. 14 is a view showing an example of a one-page discharge manner setting screen displayed by a UI module in a second embodiment.

FIG. 14 is a view showing an example of a one-page discharge manner setting screen displayed by the UI module in the second embodiment. The one-page discharge manner setting screen 1401 shown in FIG. 14 is a setting screen displayed by pressing the one-page discharge manner setting button 1101 shown in FIG. 11. The one-page discharge manner setting screen 1401 includes a check box 1402 and an OK button 1403.

The check box 1402 is an item for allowing the user to select whether the discharge manner of a one-page print job in the automatic two-sided print will be the face-down manner in a case where the discharge manner of a print job that is already under printing is the face-down manner. The user can check the check box 1402 in a case where the discharge manner of the print job under printing is the face-down manner and the user wants to discharge in the face-down manner in accordance with the discharge manner. In the meantime, when the user desires to discharge in the face-up manner sheet discharge not in accordance with the face-down manner of the print job under printing, the user may not check the check box 1402. When the OK button 1403 is pressed in a state where the check box 1402 is checked, the setting of the face-down manner is completed. When the OK button 1403 is pressed in a state where the check box 1402 is not checked, the setting of the face-up manner is completed.

Figure 15:
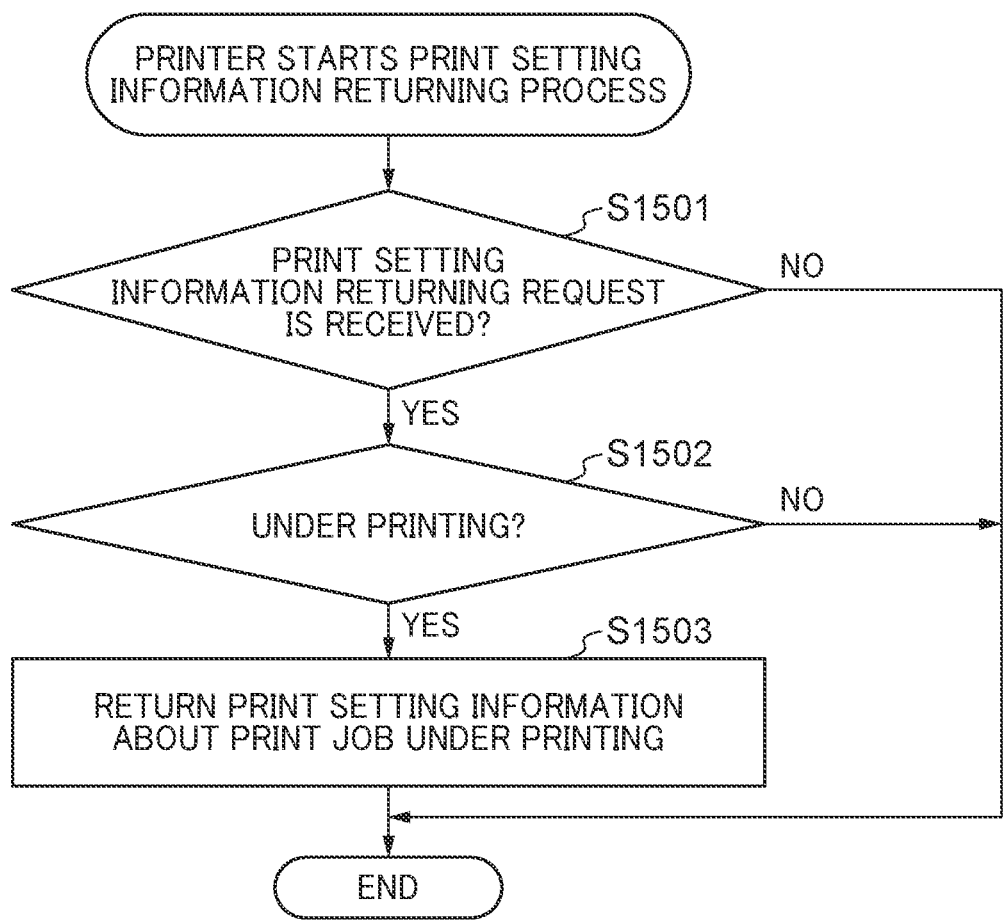
FIG. 15 is a flowchart showing a process of returning print setting information about a print job under printing when the printer receives a request to return print information.

FIG. 15 is a flowchart showing a process of returning print setting information about a print job under printing when the printer receives a print setting information returning request. Specifically, the process of this flowchart is executed by the CPU 124 loading a program stored in the ROM 122 etc. into the RAM 121 and executing the program.

As shown in FIG. 15, in step S1501, the CPU 124 of the printer 120 determines whether the print setting information returning request is received from the PC 110 (CPU 112). As a result of the determination in the step S1501, when it is determined that the print setting information returning request has been received, the process proceeds to step S1502. In the meantime, as a result of the determination in the step S1501, when it is determined that the print setting information returning request has not been received, the process ends.

In the step S1502, the CPU 124 determines whether the printer 120 is under printing. As a result of the determination in the step S1502, when it is determined that the printer 120 is under printing, the process proceeds to step S1503. In the meantime, as a result of the determination in the step S1502, when it is determined that the printer 120 is not under printing, the process ends.

In the step S1503, the CPU 124 returns the print setting information about the print job under printing to the PC 110. Thus, the PC 110 can obtain the print setting information about the print job under printing. The print setting information is received in the print job and includes a medium type, a sheet size, a two-sided setting, and the number of pages, etc.

Figure 16:
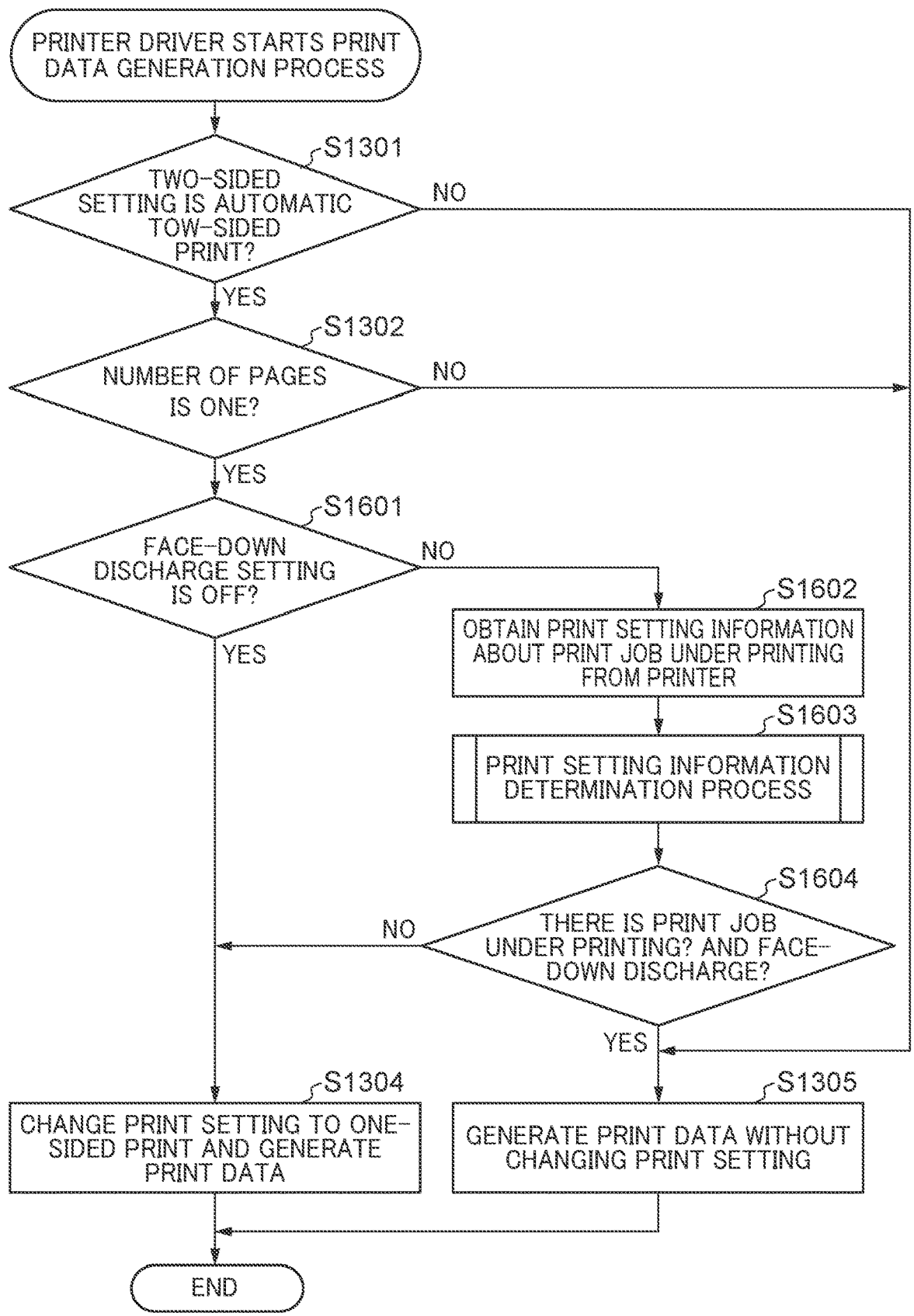
FIG. 16 is a flowchart showing a print job generation process performed by the graphic driver of the PC.

FIG. 16 is a flowchart showing a print job generation process performed by the graphic driver of the PC. Specifically, the process of this flowchart is executed by the CPU 112 developing a program like the graphic driver 207 stored in the ROM 113 onto the RAM 116 and executing the program. That is, the process described below as what is executed by the graphic driver 207 is actually executed by the CPU 112 using the graphic driver 207. The process described as what is executed by the graphic driver 207 may be achieved by another program.

Steps S1301, S1302, S1304, and S1305 in the flowchart shown in FIG. 16 are the same processes as those in the flowchart shown in FIG. 13, and thus description thereof will be omitted. As shown in FIG. 16, in step S1601 after the execution of the step S1302, the graphic driver 207 (CPU 112) determines whether the check box 1402 for the face-down manner on the one-page discharge manner setting screen 1401 shown in FIG. 14 is checked (whether the face-down discharge setting is OFF). As a result of the determination in the step S1601, when it is determined that there is no check, the process proceeds to the step S1304. In the meantime, as a result of the determination in the step S1601, when it is determined that there is a check, the process proceeds to step S1602.

In the step S1602, the graphic driver 207 obtains the print setting information about the print job under printing from the printer 120. The print setting information about the print job under printing is what is returned from the printer 120 (CPU 124) to the PC 110 in the step S1503.

In the step S1603, the graphic driver 207 performs a print setting information determination process for determining whether the face-down manner is selected based on the print setting information obtained from the printer 120.

Figure 17:
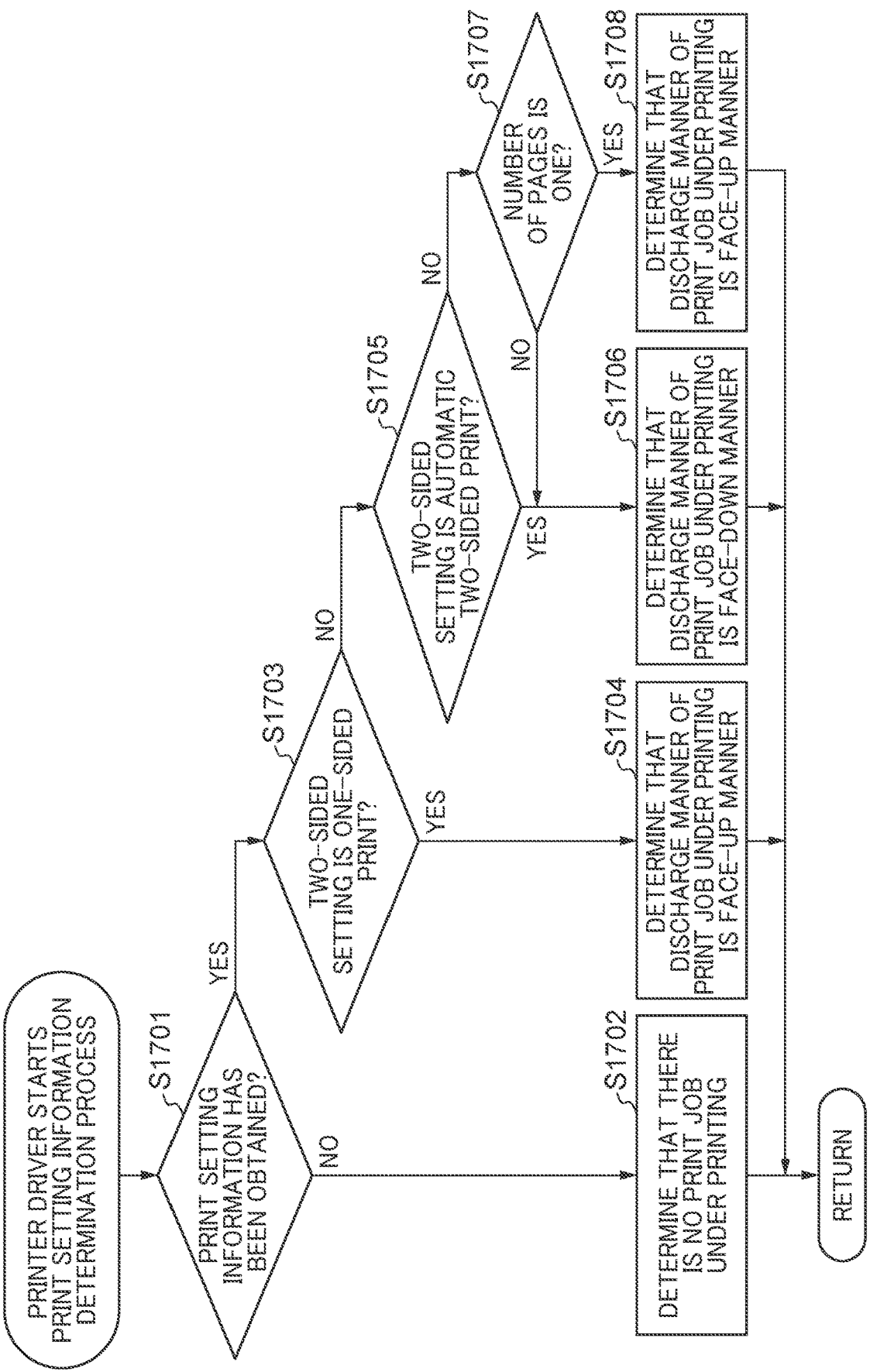
FIG. 17 is a flowchart showing a print setting information determination process executed in step S1603 as a subroutine of the process in FIG. 16.

FIG. 17 is a flowchart showing the print setting information determination process in the step S1603, which is a subroutine of FIG. 16. The print setting information determination process is a process for determining whether the discharge manner of the print job under printing is the face-down manner based on the print setting information obtained by the graphic driver 207 from the printer 120 and is executed by the graphic driver 207. As shown in FIG. 17, in step S1701, the graphic driver 207 determines whether the print setting information has been obtained from the printer 120. As a result of the determination in the step S1701, when it is determined that the print setting information has not been obtained, the process proceeds to step S1702. In the meantime, as a result of the determination in the step S1701, when it is determined that the print setting information has been obtained, the process proceeds to step S1703.

In the step S1702, the graphic driver 207 determines that there is no print job under printing.

In the step S1703, the graphic driver 207 determines whether the two-sided setting is the one-sided print based on the print setting information obtained in the step S1701. As a result of the determination in the step S1703, when it is determined that the two-sided setting is the one-sided print, the process proceeds to step S1704. In the meantime, as a result of the determination in the step S1703, when it is determined that the two-sided setting is not the one-sided print, the process proceeds to step S1705.

In the step S1704, the graphic driver 207 determines that the discharge manner of the print job under printing is the face-up manner.

In the step S1705, the graphic driver 207 determines whether the two-sided setting is the automatic two-sided print. As a result of the determination in the step S1705, when it is determined that the two-sided setting is the automatic two-sided print, the process proceeds to step S1706. In the meantime, as a result of the determination in the step S1705, when it is determined that the two-sided setting is not the automatic two-sided print, the process proceeds to step S1707.

In the step S1706, the graphic driver 207 determines that the discharge manner of the print job under printing is the face-down manner.

In the step S1707, the graphic driver 207 assumes that the two-sided setting is the manual two-sided print and determines whether the number of pages of the print job is one. As a result of the determination in the step S1707, when it is determined that the number of pages is one, the process proceeds to step S1708. In the meantime, as a result of the determination in the step S1707, when it is determined that the number of pages is not one, i.e., two or more, the process proceeds to the step S1706.

In the step S1708, the graphic driver 207 determines that the discharge manner of the print job under printing is the face-up manner.

As shown in FIG. 16, in step S1604 after execution of the step S1603, the graphic driver 207 determines whether there is a print job under printing and the discharge manner of the print job is the face-down manner. This determination is made in accordance with any of the steps S1702, S1704, S1706, and S1708 in the flowchart shown in FIG. 17. As a result of the determination in the step S1604, when it is determined that the discharge manner is the face-down manner, the process proceeds to the step S1305. In the step S1305, the printer 120 applies the reverse process to the printed sheet and discharges the printed sheet of which the back side is blank in the face-down manner. In the meantime, as a result of the determination in the step S1604, when it is determined that the discharge manner is not the face-down manner, the process proceeds to the step S1304. In the step S1304, the printer 120 discharges the printed sheet in the face-up manner as-is without applying the reverse process.

As described above, in this embodiment, when the job A (first print job) and the job B (second print job) subsequent to the job A are executed, the following selection is possible. When the job A is under execution and the discharge manner of the job A is the face-down manner, the discharge manner of the job B can be selected so as to be matched with the face-down manner. Further, when the job A is under execution and the discharge manner of the job A is the face-up manner, the discharge manner of the job B can be selected to be matched with the face-up manner. Such a selection matches the discharge manner of the job A and the discharge manner of the job B.

In addition, when the automatic two-sided print is set in the job A, it is preferable that the job B can select the face-down manner. This is because when the automatic two-sided print is set in the job A, the printed sheet is normally discharged in the face-down manner, and therefore, the job B preferably selects the face-down manner. When the manual two-sided print is set in the job A, it is preferable that the job B can select the face-up manner. This is because when the manual two-sided print is set in the job A, the printed sheet is normally discharged in the face-up manner with the printed side facing up, and therefore, the job B preferably selects the face-up manner.

Hereinafter, a third embodiment will be described with reference to FIG. 18 to FIG. 23. Differences from the above-described embodiments will be mainly described, and description of the same matters will be omitted. In the second embodiment, the process for determining whether the discharge manner of the print job to be executed next is the face-up manner or the face-down manner depending on whether the discharge manner of the print job under printing is the face-up manner or the face-down manner when there is the print job under printing has been described.

However, the next print job is not necessarily executed while the previous print job is being executed (under printing) and the next print job may be executed after completion of the previous print job. For example, a case where the printer 120 executes the job A in generating the job B by the graphic driver 207 but the job A has been already completed will be considered. In this case, if a sheet printed by the job A (hereinafter referred to as a "sheet A" in this embodiment) remains on the discharge tray of the printer 120, a sheet printed by the job B (hereinafter referred to as a "sheet B" in this embodiment) is overlapped on the sheet A. On the sheet discharge tray, the discharge manner of the sheet A may not match the discharge manner of the sheet B depending on the discharge manner of the sheet A. Therefore, in a case where the printed sheet obtained by the previous print job remains in the printer 120 in a state where the execution of the previous print job is completed, it is preferable to determine the sheet discharge manner of the next print job based on the discharge manner of the previous print job. This process will be described in this embodiment.

Figure 18:
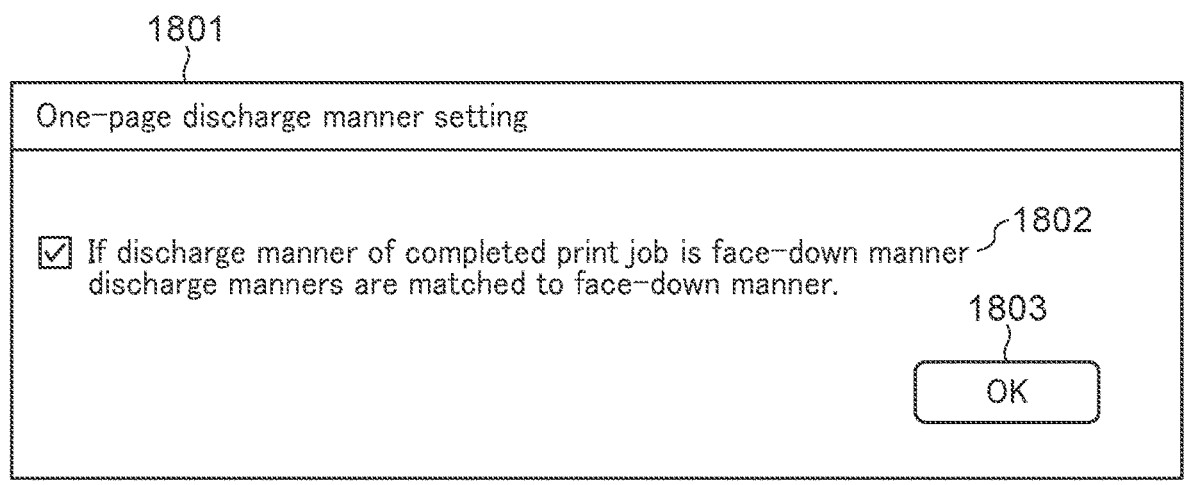
FIG. 18 is a view showing an example of a one-page discharge manner setting screen displayed by a UI module in a third embodiment.

FIG. 18 is a view showing an example of a one-page discharge manner setting screen displayed by the UI module in the third embodiment. The one-page discharge manner setting screen 1801 shown in FIG. 18 is a setting screen displayed by pressing the one-page discharge manner setting button 1101 shown in FIG. 11. The one-page discharge manner setting screen 1801 includes a check box 1802 and an OK button 1803. The check box 1802 is an item for allowing the user to select the discharge manner between the face-up manner and the face-down manner in executing a one-page print job in the automatic two-sided print in a case where the printed sheet remains in the printer 120 without being picked up. Whether the face-down manner is selected depends on whether all the printed sheets are discharged in the face-down manner.

When all the printed sheets are discharged in the face-down manner, it is preferable to check the check box 1802 to select the face-down manner. When the OK button 1803 is pressed in a state where the check box 1802 is checked, the setting of the face-down manner is completed. In the meantime, when the OK button 1803 is pressed in a state where the check box 1802 is not checked, the setting of the face-up manner is completed.

Figure 19:
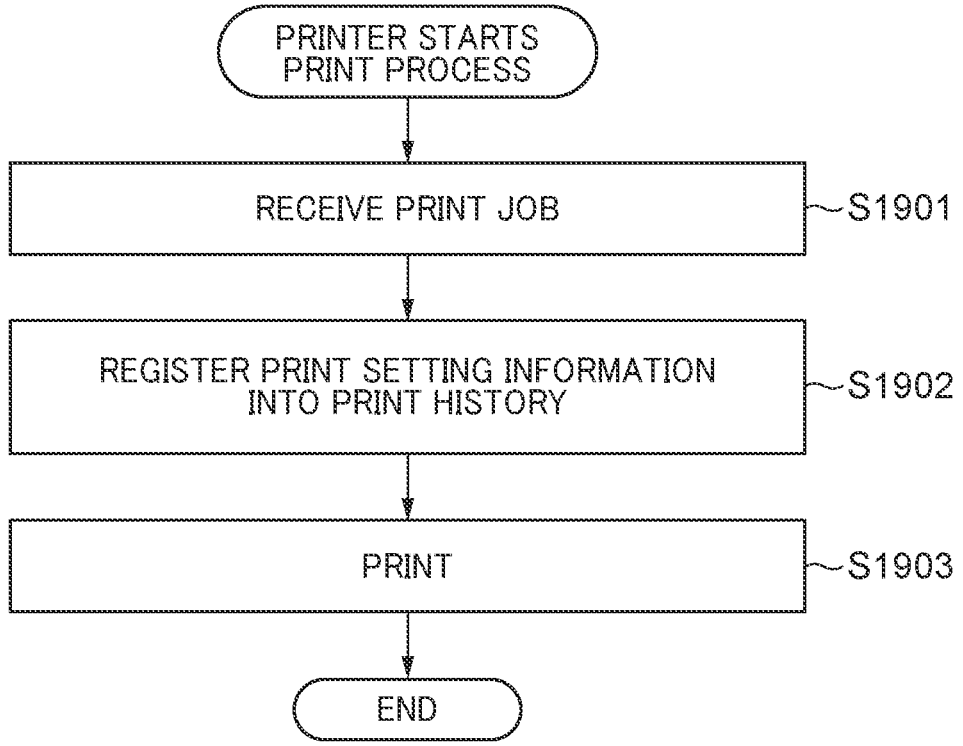
FIG. 19 is a flowchart showing a process of registering a print history when a printer receives and prints a print job.

FIG. 19 is a flowchart showing a process of registering a print history when the printer receives and prints a print job. FIG. 20 is a table showing an example of the print history. As shown in FIG. 19, in step S1901, the CPU 124 of the printer 120 receives a print job from the PC 110 (CPU 112).

In step S1902, the CPU 124 stores the print setting information about the print job in the ROM 122 as the print history. As shown in FIG. 20, the print history includes a medium (type of medium), a size (size of medium), a two-sided setting, the number of pages, and a discharge manner. Although the discharge manner can be determined based on the two-sided setting and the number of pages, it is stored as an element of the print history in this embodiment in order to facilitate understanding. In step S1903, the CPU 124 starts printing.

Figure 21:
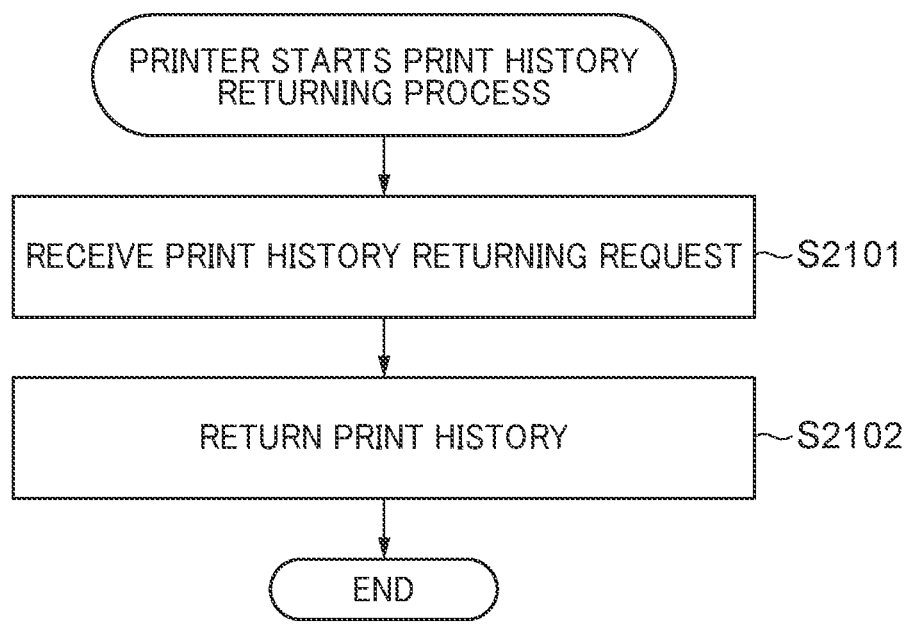
FIG. 21 is a flowchart showing a process of returning a print history when a printer is requested to return the print history.

FIG. 21 is a flowchart showing a process of returning the print history when the printer is requested to return the print history. As shown in FIG. 21, in step S2101, the CPU 124 of the printer 120 receives a print history return request from the PC 110 (CPU 112). In step S2102, the CPU 124 returns the print history stored in the step S1902 to the PC 110. Thus, the PC 110 can obtain the print history.

Figure 22:
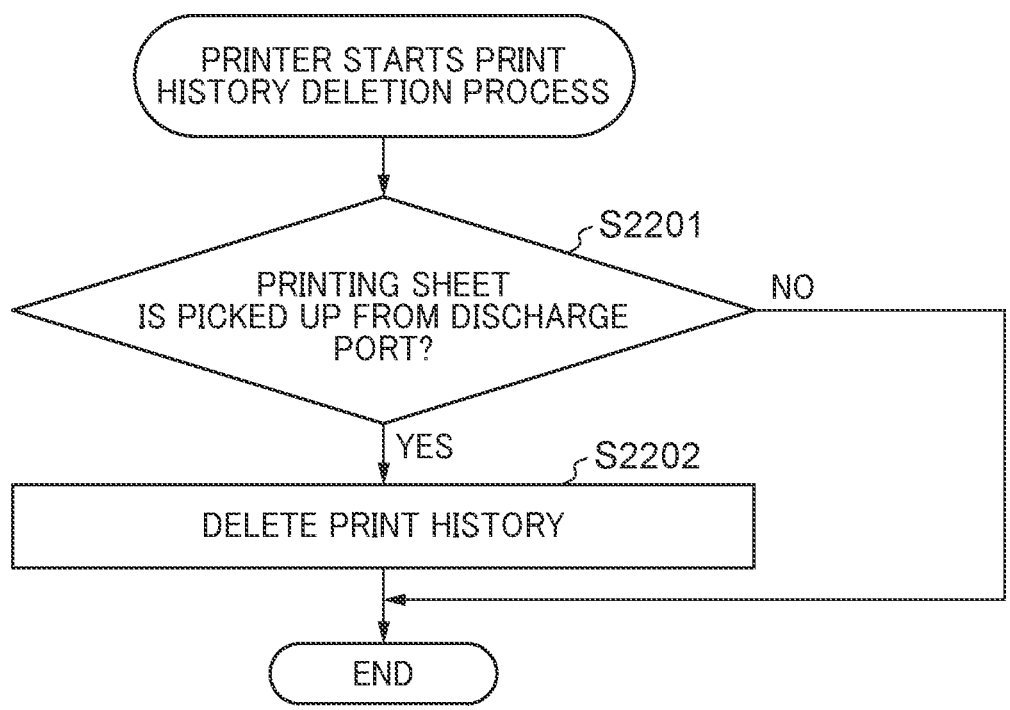
FIG. 22 is a flowchart showing a process by which a printer deletes the print history.

FIG. 22 is a flowchart showing a process by which the printer deletes the print history. As shown in FIG. 22, in step S2201, the CPU 124 of the printer 120 determines whether the printed sheet has been picked up from the discharge tray (discharge port) of the printer 120. This determination is made based on a detection result of the sensor 126 that detects presence of a printing sheet on which printing has been completed. As a result of the determination in the step S2201, when it is determined that the printed sheet has been picked up, the process proceeds to step S2202. In the meantime, as a result of the determination in the step S2201, when it is determined that the printed sheet has not been picked up, the process ends. Thus, the print history is stored in the ROM 122 as-is. In the step S2202, the CPU 124 deletes the print history from the ROM 122.

Figure 23:
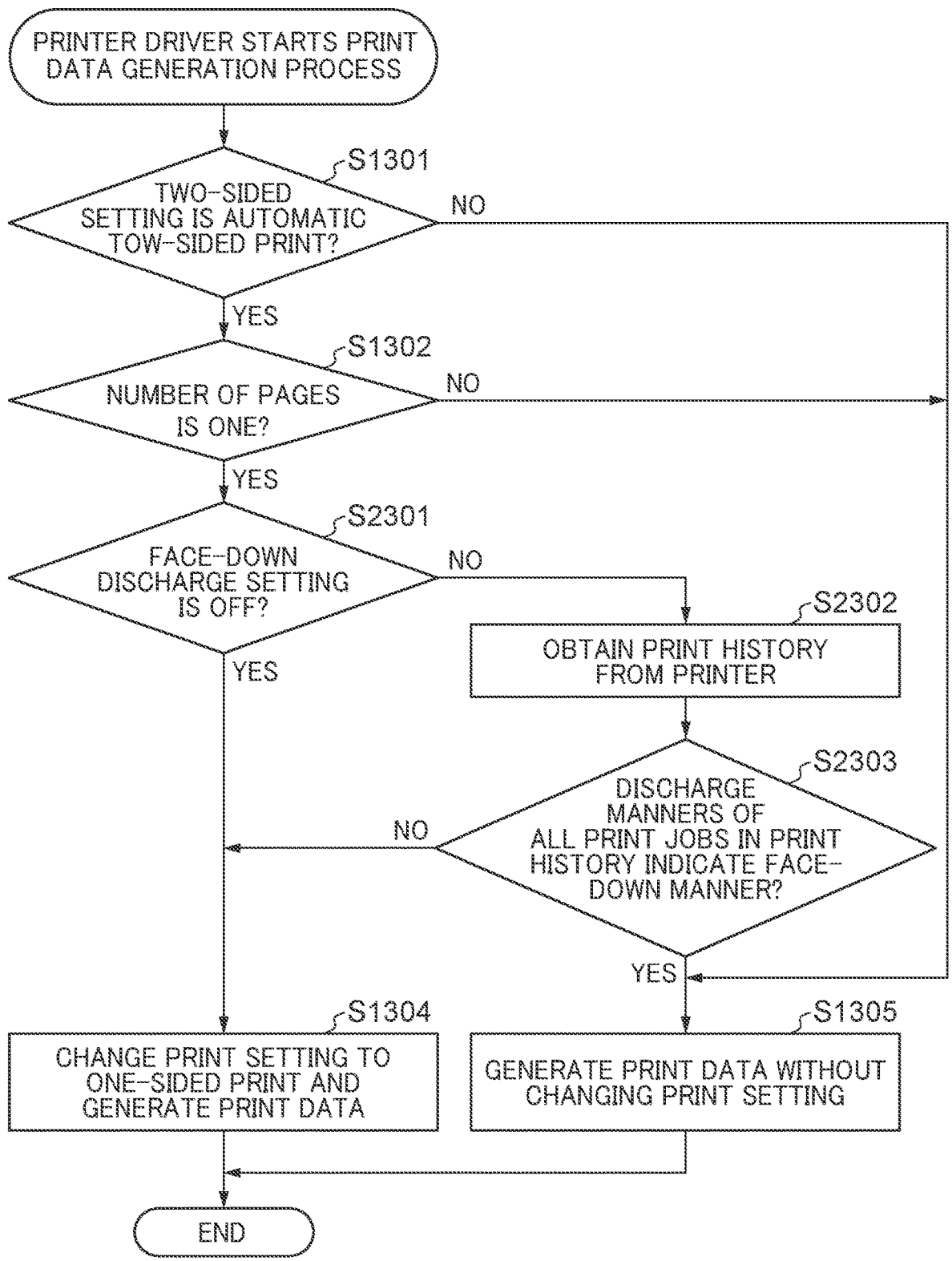
FIG. 23 is a flowchart showing a print job generation process performed by the graphic driver of the PC.

FIG. 23 is a flowchart showing a print job generation process performed by the graphic driver of the PC. Steps S1301, S1302, S1304, and S1305 in the flowchart shown in FIG. 23 are the same processes as those in the flowchart shown in FIG. 13, and thus description thereof will be omitted. As shown in FIG. 23, in step S2301 after the execution of the step S1302, the graphic driver 207 (CPU 112) determines whether the check box 1802 for the face-down manner on the one-page discharge manner setting screen 1801 shown in FIG. 18 is not checked (whether the face-down discharge setting is OFF). As a result of the determination in the step S2301, if it is determined that the check box 1802 is not checked, the process proceeds to the step S1304. In the meantime, as a result of the determination in the step S2301, when it is determined that the check box 1802 is checked, the process proceeds to step S2302.

In the step S2302, the graphic driver 207 obtains the print history from printer 120. This print history is what is returned from the printer 120 (CPU 124) to the PC 110 in the step S2102.

In step S2303, the graphic driver 207 determines whether the discharge manners of all print jobs for obtaining printing sheets that have been printed and still remain in the printer 120 indicate the face-down manner based on the print history obtained in the step S2302. As a result of the determination in the step S2303, when it is determined that all sheets are discharged in the face-down manner, the process proceeds to the step S1305. In the step S1305, the printer 120 can discharge the sheets in the face-down manner. In the meantime, as a result of the determination in the step S2303, when it is determined that the discharge manners of not all the print jobs indicate the face-down manner, that is, when it is determined that at least one print job discharges a sheet in the face-up manner, the process proceeds to the step S1304. If there is even one print job that discharges a sheet in the face-up manner, it is not necessary to match the discharge manners with the face-down manners. Therefore, in the step S1304, the printer 120 discharges the printed sheet in the face-up manner without reversing the printed sheet.

As described above, in this embodiment, when the job A (first print job) and the job B (second print job) subsequent to the job A are executed, the following selection is possible. When the job A has been executed and all sheets discharged by the job A remain in the face-down manner, it is possible to select matching of the discharge manner of the job B with the face-down manner. When the job A has been executed and all sheets discharged by the job A remain in the face-up manner, it is also possible to select matching of the discharge manner of the job B with the face-up manner. Such a selection can match the discharge manner of the job A with the discharge manner of the job B. Although the determination in the step S2201 is performed based on the detection result of the sensor 126 in this embodiment, it is not limited thereto. For example, the print time may be stored in the print history, and the determination in the step S2201 may be performed based on the print time (for example, based on only the job executed within one minute).

Hereinafter, a fourth embodiment will be described with reference to FIG. 24. Differences from the above-described embodiments will be mainly described, and the description of the same matters will be omitted. In the third embodiment, the PC 110 has the print controller and is configured to determine whether a sheet is discharged in the face-up manner or the face-down manner. In the meantime, in this embodiment, the printer 120 includes the print controller and is configured to determine whether a sheet is discharged in the face-up manner or the face-down manner. As described above, the printer 120 includes the RAM 121, ROM 122, print engine 123, CPU 124, input/output OF 125, and sensor 126 (see FIG. 1). In this embodiment, the RAM 121, ROM 122, and CPU 124 constitute the print controller.

Figure 24:
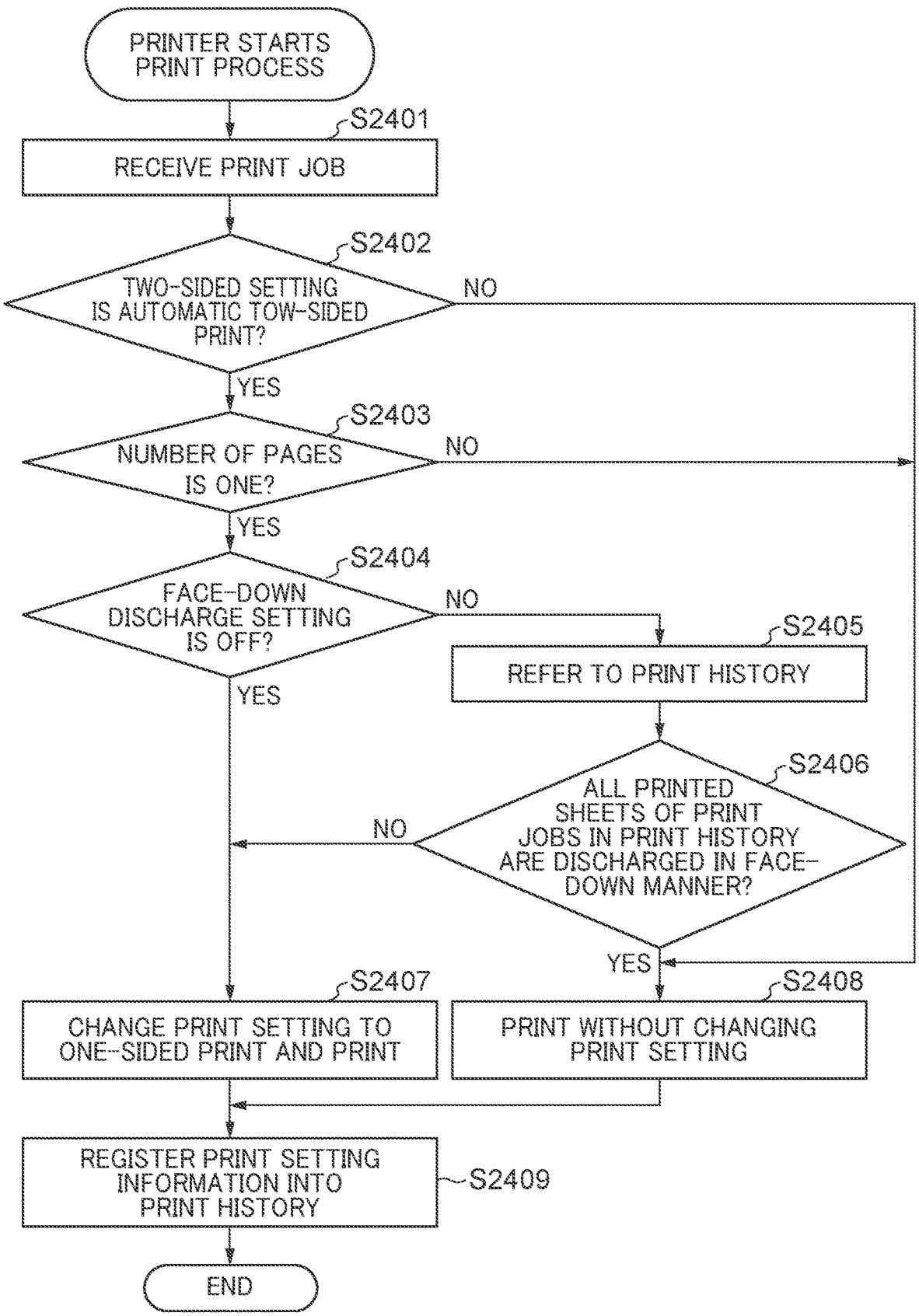
FIG. 24 is a flowchart showing a print process performed by a printer in a fourth embodiment.

FIG. 24 is a flowchart showing a print process performed by the printer in the fourth embodiment. The flowchart shown in FIG. 24 includes a process of determining whether to discharge a sheet in the face-up manner or the face-down manner. As shown in FIG. 24, in step S2401, the CPU 124 of the printer 120 receives a print job from the PC 110. This print job is what is generated by the PC 110 and does not include information indicating whether to discharge a sheet in the face-up manner or the face-down manner.

In step S2402, the CPU 124 determines whether the two-sided setting of the print job received in the step S2401 is the automatic two-sided print. As a result of the determination in the step S2402, when it is determined that the two-sided setting is the automatic two-sided print, the process proceeds to step S2403. In the meantime, as a result of the determination in the step S2402, when it is determined that the two-sided setting is not the automatic two-sided print, the process proceeds to step S2408.

In the step S2403, the CPU 124 determines whether the number of pages of the print job is one. As a result of the determination in the step S2403, when it is determined that the number of pages is one, the process proceeds to step S2404. In the meantime, as a result of the determination in the step S2403, when it is determined that the number of pages is not one, that is, two pages, the process proceeds to the step S2408.

In the step S2404, the CPU 124 determines whether the check box 1802 for the face-down manner on the one-page discharge manner setting screen 1801 shown in FIG. 18 is not checked (whether the face-down discharge setting is OFF). As a result of the determination in the step S2404, when it is determined that the check box 1802 is no checked, the process proceeds to step S2407. In the meantime, as a result of the determination in the step S2404, when it is determined that the check box 1802 is checked, the process proceeds to step S2405.

In the step S2405, the CPU 124 refers to the print history stored in the ROM 122. This print history is information managed by the registration process in the step S2408 and the deletion process shown in FIG. 22.

In step S2406, the CPU 124 determines whether all the printed sheets that are printed based on the print jobs registered in the print history referred to in the step S2405 and remain in the printer 120 are discharged in the face-down manner. As a result of the determination in the step S2406, when it is determined that all the printed sheets are discharged in the face-down manner, the process proceeds to step the S2408. In the meantime, as a result of the determination in the step S2406, when it is determined that not all the printed sheets are discharged in the face-down manner, that is, when it is determined that at least one printed sheet is discharged in the face-up manner, the process proceeds to the step S2407.

In the step S2407, the CPU 124 changes the two-sided setting of the print setting from the automatic two-sided print to the one-sided print, and then prints. In this print process, the printer 120 can discharge a sheet in the face-up manner as-is without performing the reverse process. After execution of the step S2407, the process proceeds to step S2409.

In the step S2408, the CPU 124 prints without changing the print setting. As a result of this print process, the printer 120 performs the reverse process of the printed sheet and discharges the printed sheet of which the back side is blank in the face-down manner. After execution of the step S2408, the process proceeds to the step S2409.

In the step S2409, the CPU 124 registers the print setting information about the print job performed this time in the ROM 122 as the print history. This print setting information is similar to the print history shown in FIG. 20.

As described above, also in this embodiment, similarly to the third embodiment, it is possible to appropriately switch (select) the discharge manner between the face-up manner and the face-down manner. As a result, a discharge manner of a print job that has been executed and a discharge manner of a print job that is subsequently executed can be matched. That the processes of the first and second embodiments can also be performed by the printer 120 as with this embodiment.

Hereinafter, a fifth embodiment will be described with reference to FIG. 25 to FIG. 28. Differences from the above-described embodiments will be mainly described, and the description of the same matters will be omitted. In the second to fourth embodiments, the processes of determining a discharge manner of a print job that will be subsequently executed based on a discharge manner of a print job under printing or a discharge manner of a print job that has been printed have been described. In these processes, determination in a case where there is a waiting print job is not considered. In this embodiment, a process for determining a discharge manner (the face-up manner or the face-down manner) of a print job that will be subsequently executed based on a discharge manner of a waiting print job if it exists will be described. The printer 120 has a function of holding a plurality of print jobs in the ROM 122.

Figure 25:
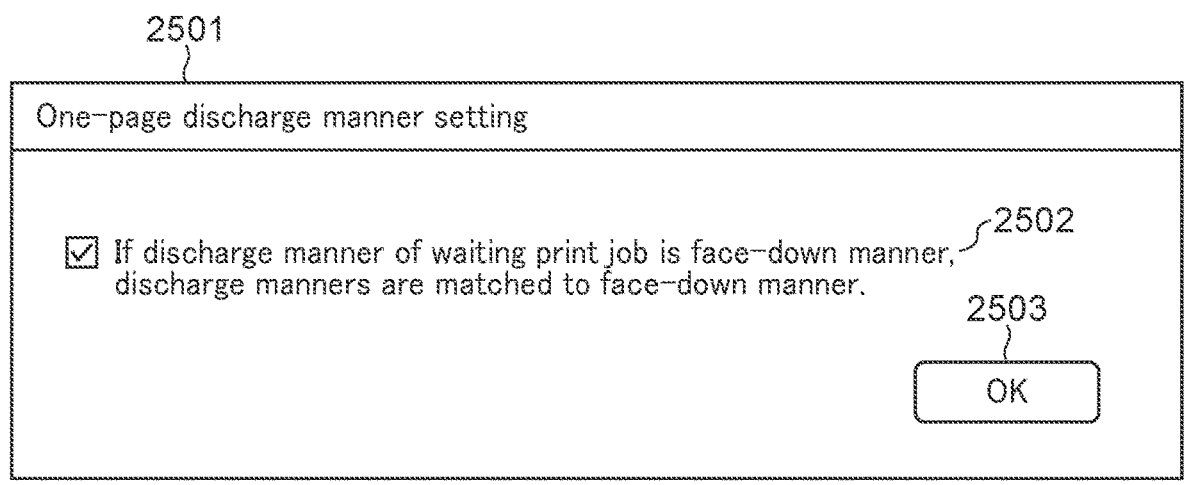
FIG. 25 is a view showing an example of a one-page discharge manner setting screen displayed on a printer in a fifth embodiment.

FIG. 25 is a view showing an example of a one-page discharge manner setting screen displayed on the printer in the fifth embodiment. The one-page discharge manner setting screen 2501 shown in FIG. 25 is a setting screen displayed on a display panel mounted on the printer 120. The one-page discharge manner setting screen 2501 includes a check box 2502 and an OK button 2503. The check box 2502 is an item for allowing the user to select whether the discharge manner of a one-page print job in the automatic two-sided print will be the face-down manner in a case where there is a waiting print job in the printer 120. Whether the face-down manner is selected depends on whether the discharge manners of all the waiting print jobs indicate the face-down manner. When the discharge manners of all the waiting print jobs indicate the face-down manner, it is preferable to check the check box 2502 to select the face-down manner. When the OK button 2503 is pressed in a state where the check box 2502 is checked, the setting of the face-down manner is completed. In the meantime, when the OK button 2503 is pressed in a state where the check box 2502 is not checked, the setting of the face-up manner is completed.

Figure 26:
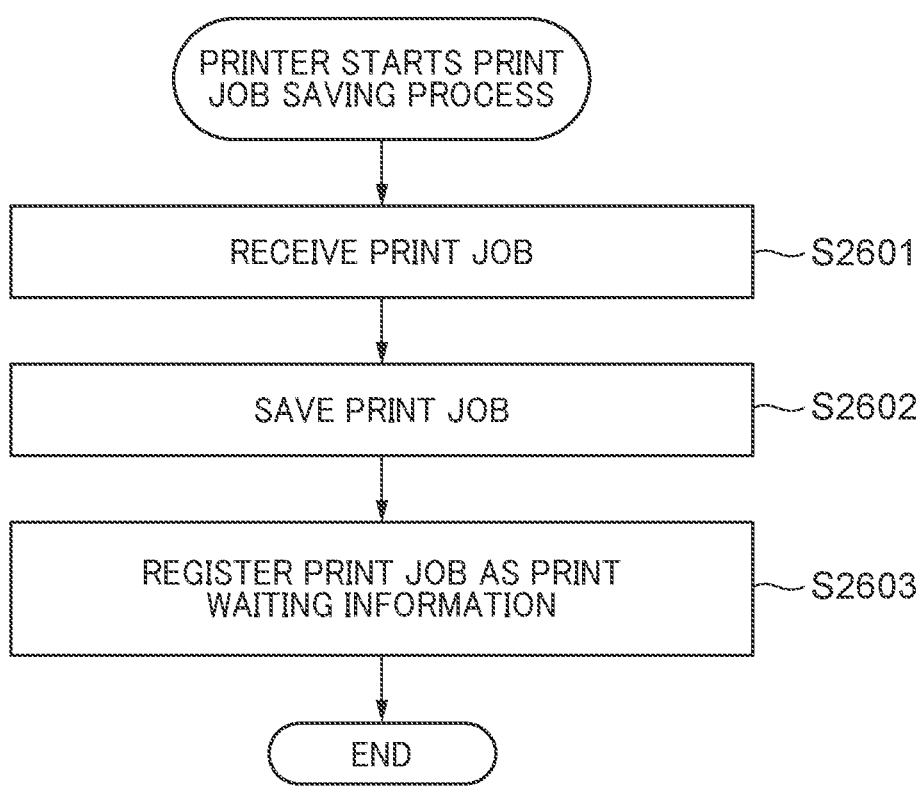
FIG. 26 is a flowchart showing a print job saving process executed when the printer receives the print job.

FIG. 26 is a flowchart showing a process of saving a print job when the printer receives the print job. As shown in FIG. 26, in step S2601, the CPU 124 of the printer 120 receives the print job from the PC 110. In step S2602, the CPU 124 saves the print job received in the step S2601 into the ROM 122. In step S2603, the CPU 124 registers the print job as print waiting information in the ROM 122.

FIG. 27 is a table showing examples of print queue information registered in the print job saving process shown in FIG. 26. As shown in FIG. 27, the information saved as the print waiting information includes a document name of a print job, a medium of the print setting information, a size, a two-sided setting, and the number of pages of the print job. The print waiting information is registered in the order of reception of a print job. The printer 120 prints in this registration order.

FIG. 28 is a flowchart showing a print process performed by the printer. As shown in FIG. 28, in step S2801, the CPU 124 of the printer 120 refers to the print waiting information stored in the ROM 122 to determine presence of a waiting print job. This print waiting information is similar to the print waiting information shown in FIG. 27. As a result of the determination in the step S2801, when it is determined that there is a waiting print job, the process proceeds to step S2802. In the meantime, as a result of the determination in the step S2801, when it is determined that there is no waiting print job, the process waits in the step S2801 as-is, that is, the determination in the step S2801 is repeated.

From the step S2802, the CPU 124 prints in the registration order. In step S2802, the CPU 124 determines whether the two-sided setting of the print job whose print turn has come in the registration order is the automatic two-sided print. As a result of the determination in the step S2802, when it is determined that the two-sided setting is the automatic two-sided print, the process proceeds to step S2803. In the meantime, as a result of the determination in the step S2802, when it is determined that the two-sided setting is not the automatic two-sided print, the process proceeds to step S2808.

In the step S2803, the CPU 124 determines whether the number of pages of the print job is one. As a result of the determination in the step S2803, when it is determined that the number of pages is one, the process proceeds to step S2804. In the meantime, as a result of the determination in the step S2803, when it is determined that the number of pages is not one, that is, two pages, the process proceeds to the step S2808.

In the step S2804, the CPU 124 determines whether the check box 2502 for the face-down manner on the one-page discharge manner setting screen 2501 shown in FIG. 25 is checked (whether the face-down discharge setting is OFF). As a result of the determination in the step S2804, when it is determined that the check box 2501 is not checked, the process proceeds to step S2807. In the meantime, as a result of the determination in the step S2804, when it is determined that the check box 2501 is checked, the process proceeds to step S2805.

In the step S2805, the CPU 124 refers to the print queue information stored in the ROM 122.

In step S2806, the CPU 124 determines, based on the print waiting information referred to in the step S2805, whether there is a waiting print job and the two-sided setting of all the waiting print jobs is the automatic two-sided print (discharge in the face-down manner). As a result of the determination in the step S2806, when it is determined that the discharge manner of all the waiting print jobs is the face-down manner, the process proceeds to the step S2808. In the meantime, as a result of the determination in the step S2806, when it is determined that the discharge manners of not all the print jobs indicate the face-down manner, that is, when it is determined that the discharge manner of at least one print job is the face-up manner, the process proceeds to the step S2807.

In the step S2807, the CPU 124 changes the two-sided setting of the print settings from the automatic two-sided print to the one-sided print and prints. In this print process, the printer 120 discharges the printed sheet in the face-up manner as-is without reversing the printed sheet.

In the step S2808, the CPU 124 prints without changing the print settings. In this print process, the printer 120 discharges the printed sheet in the face-down manner. Further, in both the case where the print is completed in the step S2807 and the case where the print is completed in the step S2808, the process of the flowchart shown in FIG. 28 is repeated by referring to the print waiting information to confirm whether there is a waiting print job.

As described above, in this embodiment, in a case where the job A (first print job) is executed and the job B (second print job) is executed next to the job A, if the job A is waiting for execution and its discharge manner is the face-down manner, the discharge manner of the job B can be matched with the face-down manner. If the job A is waiting for execution and the sheet discharge is face-up sheet discharge, the sheet discharge in the job B can be matched with the face-up manner. By such a selection, the discharge manner can be appropriately switched between the face-up manner and the face-down manner. This enables to match the discharge manner of the job A and the discharge manner of the job B. This embodiment can be combined with the process for determining a discharge manner of a generating print job based on the discharge manner of a print job under printing or a discharge manner of a print job that has been printed described in the second, third, or fourth embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The functions of the above-described embodiments are not only achieved by executing the program code by the computer. For example, the present invention also includes a case where an operating system (OS) running on a computer performs a part or all of the actual process based on instructions of the program code and the functions of the above-described embodiments are achieved by the process. Further, the program code read from the storage medium is written in a memory provided in a function expansion board inserted into the computer or a function expansion unit connected to the computer. Thereafter, a CPU installed in the function expansion board or the function expansion unit performs a part or all of the actual process based on instructions of the program code, and the functions of the above-described embodiments are achieved by the process. Furthermore, although the configuration in which the printer driver is used as software for transmitting a print job to the printer has been described in each of the above-described embodiments, the present invention is not limited thereto. The software may be, for example, a printer driver that does not constitute a graphic driver or a language monitor, or a standard class driver of Windows (registered trademark) or a function extension application for associated with the standard class driver.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-169289, filed Oct. 21, 2022, which is hereby incorporated by reference herein in its entirety.

What is claimed is:

1. A control method for an information processing apparatus that controls a printer capable of printing on a sheet-shaped recording medium having a first side and a second side on a back side of the first side, the control method comprising:

a setting step of setting, as a print setting for executing a first print process, a two-sided print setting for printing on both the first and second sides or a one-sided print setting for printing on only one of the first and second sides; and a control step of controlling whether to execute control for discharging a recording medium printed by the first print process in a face-up manner or to execute control for discharging a recording medium printed by the first print process in a face-down manner based on at least one of whether the two-sided print setting is set as a print setting for executing a second print process that is executed by the printer before the first print process and whether the second print process is a process for printing a plurality of pages, in a case where the two-sided print setting is set as a print setting for executing the first print process and where the first print process is a process for printing one page.

2. The control method according to claim 1, wherein the control for discharging the recording medium printed by the first print process in the face-down manner is executed in a case where the two-sided print setting is set as the print setting for executing the first print process, where the first print process is a process for printing one page, where the two-sided print setting is set as the print setting for executing the second print process, and where the second print process is a process for printing a plurality of pages.

3. The control method according to claim 1, wherein the control for discharging the recording medium printed by the first print process in the face-up manner is executed in a case where the two-sided print setting is set as the print setting for executing the first print process, where the first print process is a process for printing one page, where the two-sided print setting is set as the print setting for executing the second print process, and where the second print process is a process for printing one page.

4. The control method according to claim 1, wherein the control for discharging the recording medium printed by the first print process in the face-up manner is executed in a case where the two-sided print setting is set as the print setting for executing the first print process, where the first print process is a process for printing one page, and where the one-sided print setting is set as the print setting for executing the second print process.

5. The control method according to claim 1, wherein the control for discharging the recording medium printed by the first print process in the face-up manner is control for changing the print setting for executing the first print process to the one-sided print setting from the two-sided print setting and for generating print data that causes the printer to execute the first print process.

6. The control method according to claim 1, wherein the control for discharging the recording medium printed by the first print process in the face-down manner is control for generating print data that causes the printer to execute the first print process without changing the print setting for executing the first print process from the two-sided print setting.

7. The control method according to claim 1, further comprising a control step of executing the control for discharging the recording medium printed by the first print process in the face-up manner in a case where the one-sided print setting is set as the print setting for executing the first print process.

8. The control method according to claim 7, wherein the control for discharging the recording medium printed by the first print process in the face-up manner is executed in a case where the one-sided print setting is set as the print setting for executing the first print process, regardless of whether the two-sided print setting is set as the print setting for executing the second print process and whether the second print process is a process for printing a plurality of pages.

9. The control method according to claim 1, further comprising a control step of executing the control for discharging the recording medium printed by the first print process in the face-down manner in a case where the two-sided print setting is set as the print setting for executing the first print process and where the first print process is a process for printing a plurality of pages.

10. The control method according to claim 9, wherein the control for discharging the recording medium printed by the first print process in the face-down manner is executed in a case where the two-sided print setting is set as the print setting for executing the first print process and where the first print process is a process for printing a plurality of pages, regardless of whether the two-sided print setting is set as the print setting for executing the second print process and whether the second print process is a process for printing a plurality of pages.

11. The control method according to claim 1, wherein the second print process is a process under execution in the printer.

12. The control method according to claim 11, wherein the control for discharging the recording medium printed by the first print process in the face-up manner is executed in a case where the two-sided print setting is set as the print setting for executing the first print process, where the first print process is a process for printing one page, and where there is no print process under execution in the printer.

13. The control method according to claim 1, further comprising an obtainment step of obtaining print setting information related to a print setting for executing the second print process from the printer,
wherein whether to execute control for discharging the recording medium printed by the first print process in the face-up manner or to execute control for discharging the recording medium printed by the first print process in the face-down manner is controlled based on the print setting information obtained, in a case where the two-sided print setting is set as the print setting for executing the first print process and where the first print process is a process for printing one page.

14. The control method according to claim 1, further comprising a transmission step of transmitting print data that causes the printer to execute the first print process to the printer.

15. The control method according to claim 1, wherein the control for discharging the recording medium printed by the first print process in the face-up manner and the control for discharging the recording medium printed by the first print process in the face-down manner are executed by a printer driver of the information processing apparatus.

16. The control method according to claim 1, further comprising a reception step of receiving a predetermined input from a user,
wherein whether to execute control for discharging the recording medium printed by the first print process in the face-up manner or to execute control for discharging the recording medium printed by the first print process in the face-down manner is controlled based on at least one of whether the two-sided print setting is set as the print setting for executing the second print process and whether the second print process is a process for printing a plurality of pages, in a case where the predetermined input is received, where the two-sided print setting is set as the print setting for executing the first print process, and where the first print process is a process for printing one page, and
wherein the control for discharging the recording medium printed by the first print process in the face-up manner is executed, in a case where the predetermined input is not received, where the two-sided print setting is set as the print setting for executing the first print process, and where the first print process is a process for printing one page, regardless of whether the two-sided print setting is set as the print setting for executing the second print process and whether the second print process is a process for printing a plurality of pages.

17. The control method according to claim 1, wherein the printer is an inkjet printer.

18. A non-transitory computer-readable storage medium storing a control program causing a computer of an information processing apparatus to execute a control method for a printer capable of printing on a sheet-shaped recording medium having a first side and a second side on a back side of the first side, the control method comprising:
a setting step of setting, as a print setting for executing a first print process, a two-sided print setting for printing on both the first and second sides or a one-sided print setting for printing on only one of the first and second sides; and
a control step of controlling whether to execute control for discharging a recording medium printed by the first print process in a face-up manner or to execute control for discharging a recording medium printed by the first print process in a face-down manner based on at least one of whether the two-sided print setting is set as a print setting for executing a second print process that is executed by the printer before the first print process and whether the second print process is a process for printing a plurality of pages, in a case where the two-sided print setting is set as a print setting for executing the first print process and where the first print process is a process for printing one page.

19. An information processing apparatus that controls a printer capable of printing on a sheet-shaped recording medium having a first side and a second side on a back side of the first side, the information processing apparatus comprising:
a memory containing instructions and a processor for executing the instructions to set, as a print setting for executing a first print process, a two-sided print setting for printing on both the first and second sides or a one-sided print setting for printing on only one of the first and second sides; and
a controller configured to control whether to execute control for discharging a recording medium printed by the first print process in a face-up manner or to execute control for discharging a recording medium printed by the first print process in a face-down manner based on at least one of whether the two-sided print setting is set as a print setting for executing a second print process that is executed by the printer before the first print process and whether the second print process is a process for printing a plurality of pages, in a case where the two-sided print setting is set as a print setting for executing the first print process and where the first print process is a process for printing one page.

* * * * *